(12) United States Patent
Yue et al.

(10) Patent No.: US 10,404,342 B2
(45) Date of Patent: Sep. 3, 2019

(54) MULTIUSER MIMO FOR LARGE ANTENNA SYSTEMS WITH HYBRID BEAMFORMING

(71) Applicant: Futurewei Technologies, Inc., Plano, TX (US)

(72) Inventors: Guosen Yue, Edison, NJ (US); Bohan Zhang, Newark, DE (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 195 days.

(21) Appl. No.: 15/197,030

(22) Filed: Jun. 29, 2016

(65) Prior Publication Data

US 2018/0006696 A1    Jan. 4, 2018

(51) Int. Cl.

| H04L 5/00 | (2006.01) |
| H04B 7/06 | (2006.01) |
| H04W 72/04 | (2009.01) |
| H04B 7/0417 | (2017.01) |
| H04L 1/00 | (2006.01) |
| H04B 7/0452 | (2017.01) |
| H04B 7/0456 | (2017.01) |
| H04B 15/00 | (2006.01) |

(Continued)

(52) U.S. Cl.
CPC ......... *H04B 7/0617* (2013.01); *H04B 7/0421* (2013.01); *H04B 7/0452* (2013.01); *H04B 7/0486* (2013.01); *H04B 7/063* (2013.01); *H04B 7/0632* (2013.01); *H04B 7/0673* (2013.01); *H04B 7/0695* (2013.01); *H04B 15/005* (2013.01); *H04L 1/0026* (2013.01); *H04L 5/0048* (2013.01); *H04W 72/046* (2013.01); *H04W 88/02* (2013.01); *H04W 88/08* (2013.01)

(58) Field of Classification Search
None
See application file for complete search history.

(56) References Cited

U.S. PATENT DOCUMENTS

| 2011/0028141 A1 | 2/2011 | Yang et al. |
| 2011/0103501 A1 | 5/2011 | Khojastepour et al. |
| 2013/0343303 A1 | 12/2013 | Kim et al. |

(Continued)

FOREIGN PATENT DOCUMENTS

| CN | 102013952 A | 4/2011 |
| CN | 102387006 A | 3/2012 |
| WO | 2015046895 A1 | 4/2015 |

OTHER PUBLICATIONS

PCT/CN2017/089627, ISR, Sep. 5, 2017.
European Search Report dated Apr. 11, 2019 in European Patent Application No. EP17819170.6, 16 pages.

*Primary Examiner* — Marcus Smith
(74) *Attorney, Agent, or Firm* — Vierra Magen Marcus LLP

(57) ABSTRACT

A hybrid combination of analog RF beamforming and digital pre-coding is used to improve signal-to-noise ratio and mitigate interference as between an RF base station and a plurality of wireless receivers within a cell area of the base station. Feedback overhead for beamforming training may be reduced by using indices for identifying the preferred beams of each wireless receiver. Scheduling for channel training may be based on identifying non-colliding ones of the RF beams and assigning these to corresponding wireless receivers which can best use the assigned beams in shared transmission slots.

23 Claims, 9 Drawing Sheets

(51) Int. Cl.
*H04W 88/08* (2009.01)
*H04W 88/02* (2009.01)

(56) References Cited

U.S. PATENT DOCUMENTS

| | | | |
|---|---|---|---|
| 2015/0282122 A1* | 10/2015 | Kim | H04L 25/03898 370/329 |
| 2016/0072563 A1 | 3/2016 | Lee et al. | |
| 2016/0072570 A1 | 3/2016 | Kimura et al. | |
| 2016/0080058 A1 | 3/2016 | Kang et al. | |
| 2016/0134352 A1* | 5/2016 | Stirling-Gallacher | H04B 7/0639 370/329 |
| 2016/0337016 A1* | 11/2016 | Capar | H04B 7/0456 |
| 2016/0337056 A1* | 11/2016 | Frenne | H04B 7/0695 |
| 2017/0223689 A1 | 8/2017 | Son et al. | |
| 2017/0272133 A1* | 9/2017 | Chen | H04B 7/0421 |
| 2018/0076881 A1* | 3/2018 | Zhu | H04B 7/204 |
| 2018/0159600 A1* | 6/2018 | Kim | H04B 7/0617 |

* cited by examiner

105

300

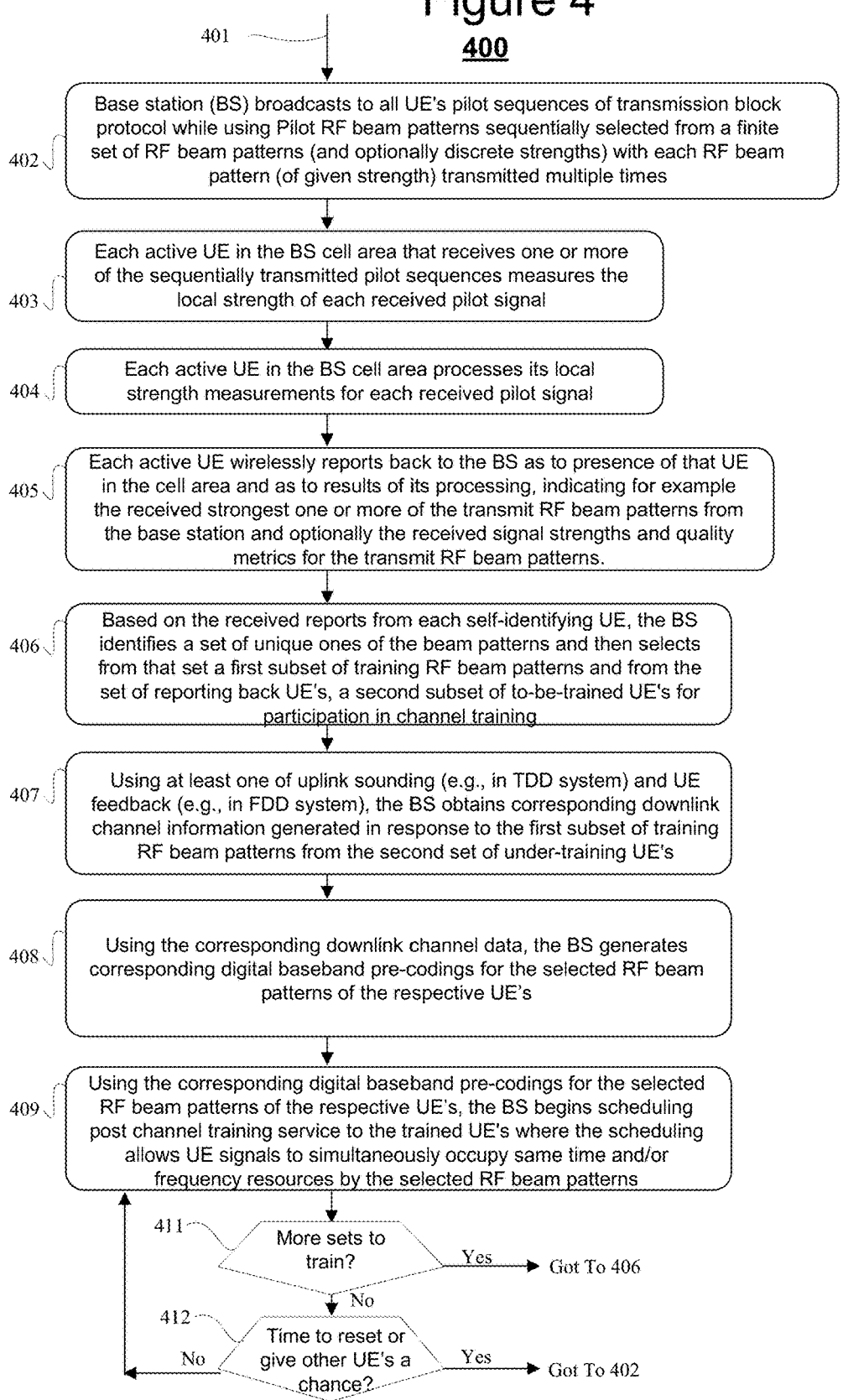

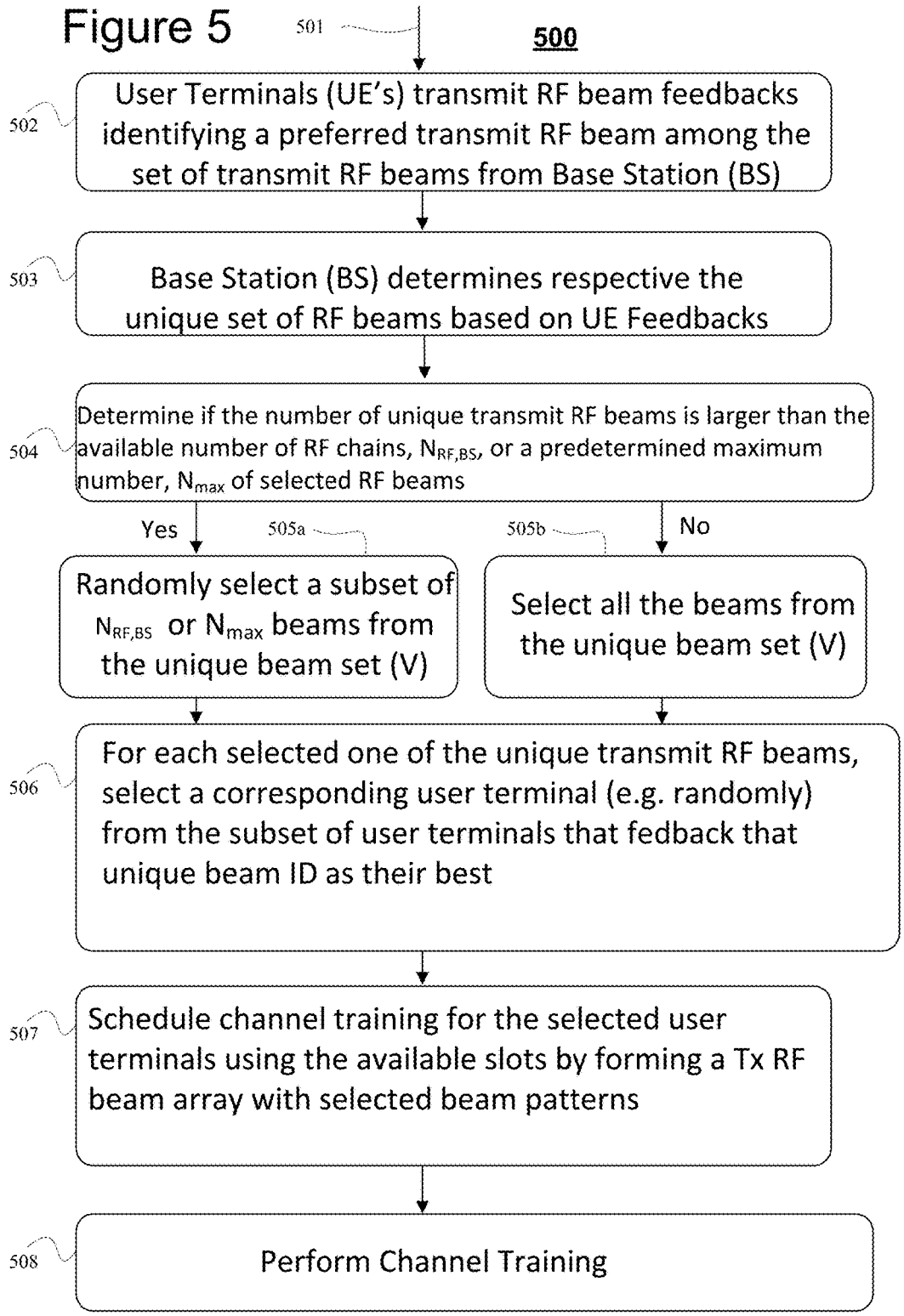

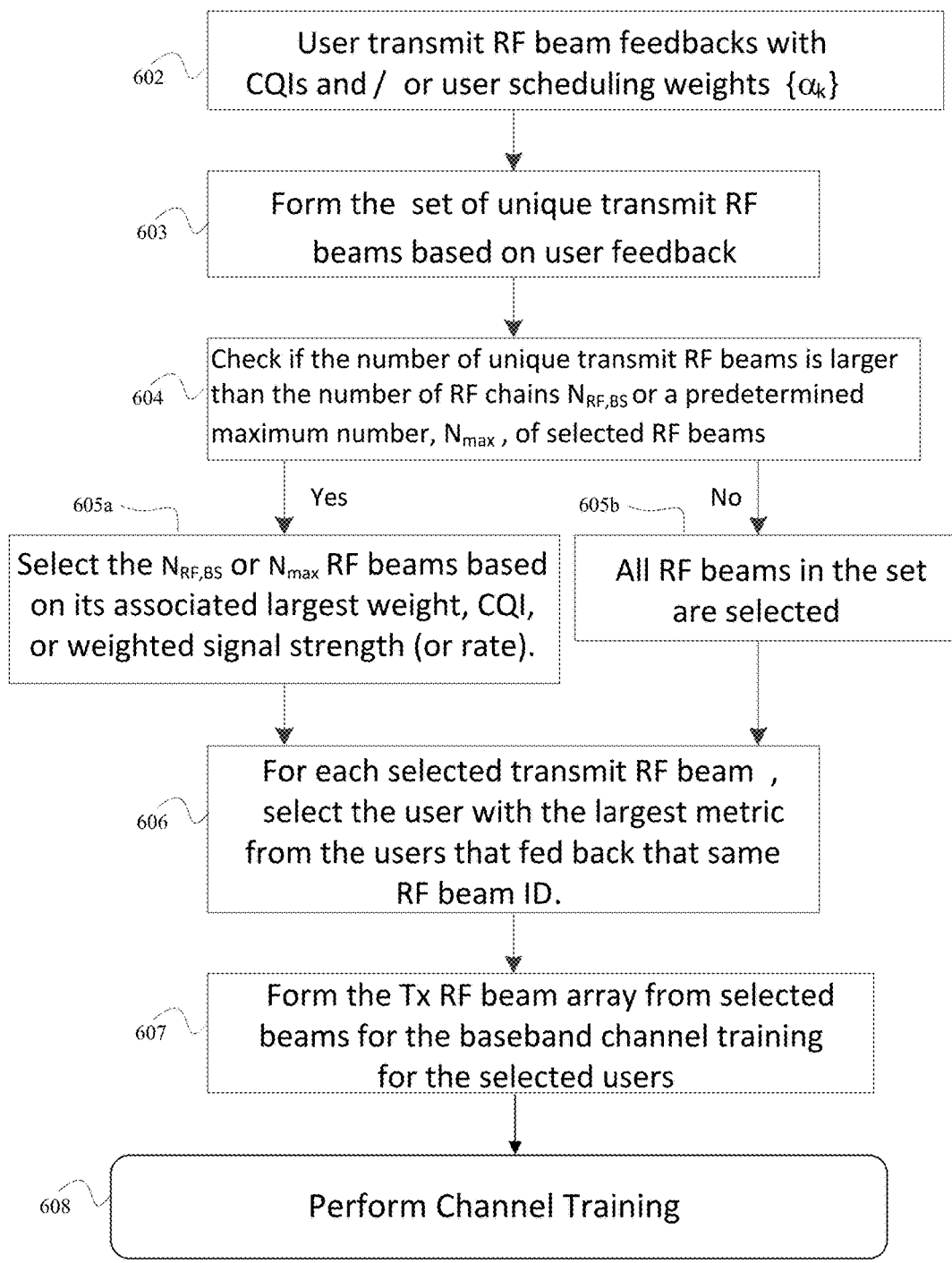

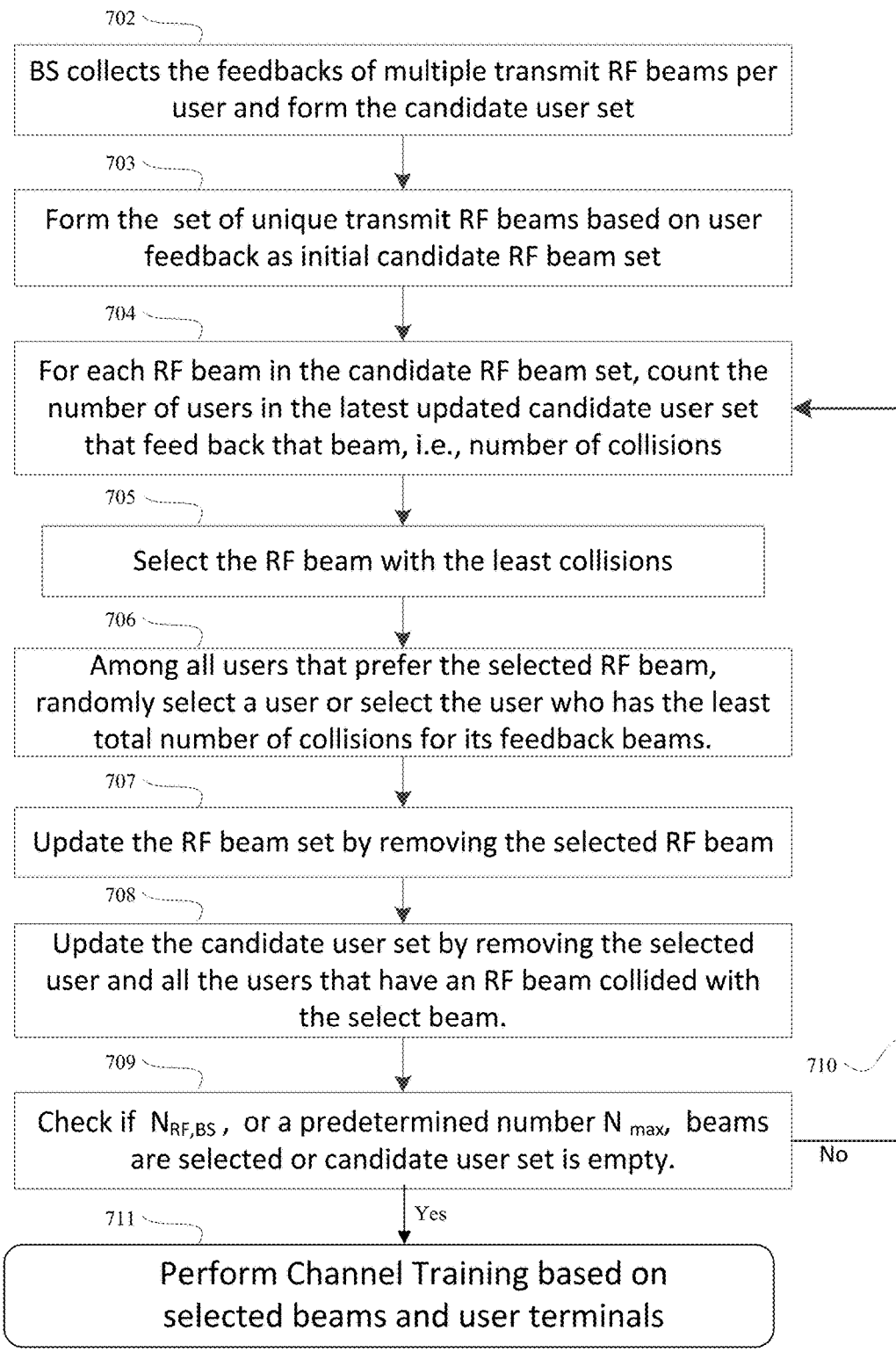

MULTIUSER MIMO FOR LARGE ANTENNA SYSTEMS WITH HYBRID BEAMFORMING

BACKGROUND

Signal to noise ratio (SNR) and network throughput can be improved for spatially distributed wireless terminals (a.k.a. User Equipment units or UE's) if the Base Station (BS) servicing them utilizes selective beamforming. However selective beamforming can be complex and expensive, especially when a large number of RF chains need to be used in both the Base Station (BS) and the serviced wireless terminals (UE's).

SUMMARY

A hybrid beamforming method performed by a base station and in accordance with the present disclosure comprises: (a) sequentially indexing through a finite set of RF output beam patterns using an analog beamforming subsystem of the base station while transmitting pilot signals; (b) receiving wireless feedback reports from one or more terminals identifying at least one preferred RF output beam pattern as received by the respective feedback-providing terminal; (c) assigning to one assignable transmission slot, two or more of the feedback-providing terminals for simultaneous use for forward link transmissions; and (d) selecting different RF output beam patterns for carrying simultaneous data transmissions respectively for the two or more assigned terminals wherein the assigning of the two or more terminals to the assignable transmission slot and the selecting of the different RF output beams is based on the respective wireless feedback reports received by the base station.

A hybrid beamforming system in accordance with the present disclosure comprises: (a) a base station having a digital precoding portion and an analog RF beamforming portion; and (b) a plurality of wireless terminals each having a respective analog RF beam tuning portion and/or a corresponding baseband digital fine tuning portion; wherein the base station is configured to: (c) establish wireless communication with the wireless terminals using a transmission protocol having one or both of pre-assigned and assignable transmission slots; (d) sequentially index through a finite set of RF output beam patterns formable by the base station using the analog beamforming portion of the base station; (e) receive wireless feedback reports from one or more of the wireless terminals identifying at least one preferred RF output beam pattern received by the corresponding one or more wireless terminals; (f) assign to at least one of the assignable transmission slot, two or more wireless terminals that produced the wireless feedback reports; and (g) use two or more different RF output beam patterns for carrying out respective data transmissions for the two or more assigned terminals in the assigned at least one of the assignable transmission slots based on the respective wireless feedback reports received by the base station.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Aspects of the present disclosure are illustrated by way of example and are not limited by the accompanying figures for which like references indicate like elements.

FIG. 4 is a flow chart depicting the procedures for servicing multiple UE's simultaneously using hybrid beamforming.

FIG. 5 is a flow chart depicting a method for jointly selecting transmit RF beams and user terminals in response to single beam identifying feedback.

FIG. 6 is a flow chart depicting a method for jointly selecting transmit RF beams and user terminals in response to single beam identifying feedback made with signal strength and/or scheduling weight metrics, where the selecting is for increasing probability of serving larger number of multiple users simultaneously with better performance.

FIG. 7 is a flow chart depicting a method for jointly selecting transmit RF beams and user terminals in response to at least some of the responding user terminals identifying two or more beams or beam patterns.

DETAILED DESCRIPTION

Hybrid beamforming methods are disclosed for improving signal to noise ratio (SNR) and total throughput as between a Base Station (BS) and serviced wireless terminals (UE's) of its cell area. In one embodiment, the BS transmits beamformed signals of sequentially different patterns chosen from a finite set of beam patterns available to it by means of RF analog manipulation alone. Each UE that detects respective portions of the one or more unique beam patterns feeds back a report identifying one or more of the detected beam patterns (or identifying the signal or slot in which it was sent; e.g., by use of item identifying indexes) that worked best for that UE. The UE may include in the feedback report, additional information further identifying at least one of received signal strength and a quality metric of one or more of the locally detected RF beam patterns corresponding to the preferred transmit beam pattern of the report. The BS then schedules a multidimensional transmission protocol plan that includes, where practical, shared simultaneous use of one or more transmission slots by one or more of the UE's using the same time and/or frequency resources. The multidimensional transmission protocol may be one employing frequency division multiple access) and/or time division multiple access for the resources shared by the respective UE's. Adaptation to short term dynamic channel condition changes is performed with baseband pre-coding optimized for the utilized beam patterns.

Figure 1A:
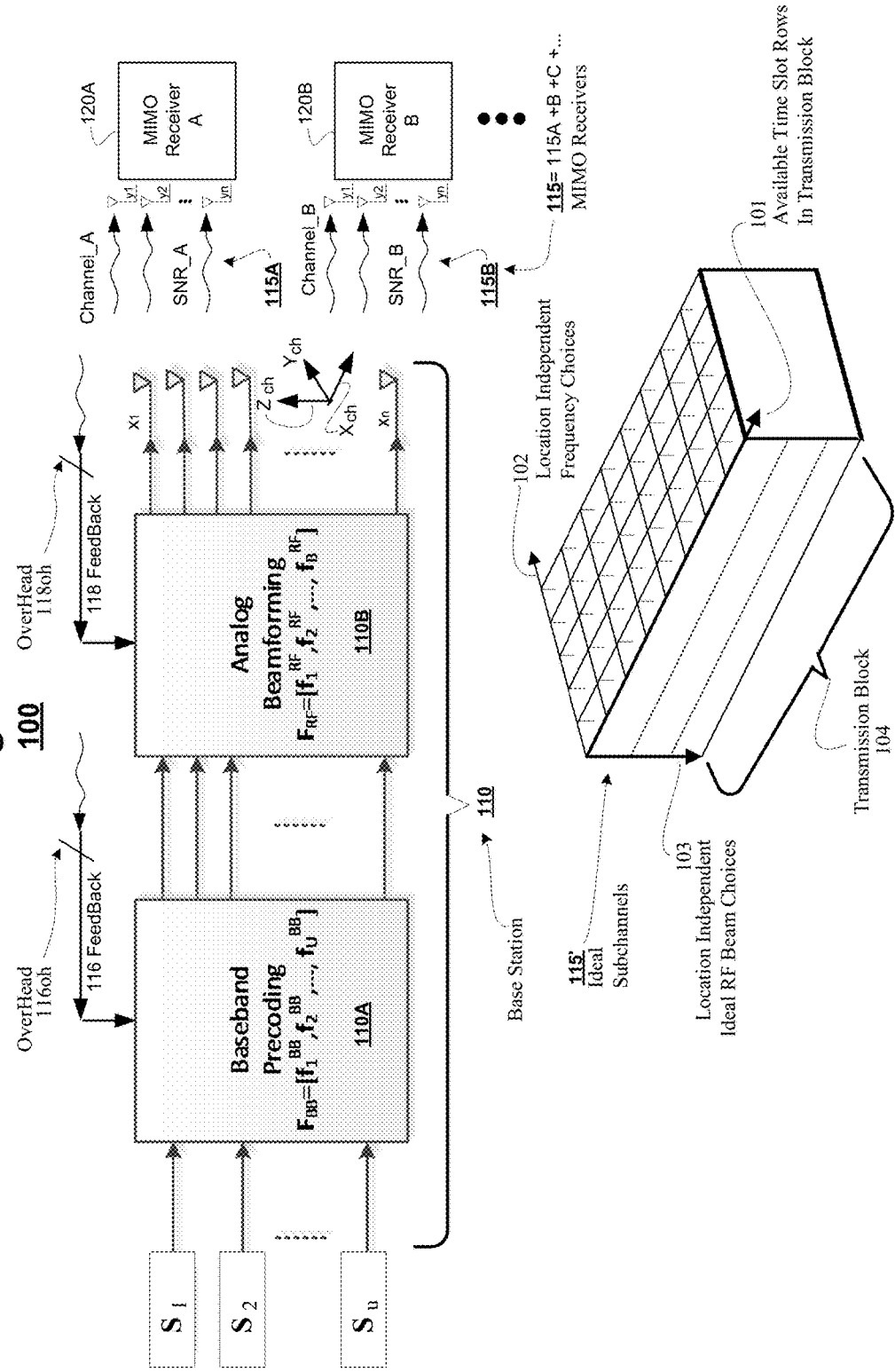
FIG. 1A is a schematic diagram showing a hybrid beam forming system configured to provide improved SNR and to mitigate interference between multiple receivers.

FIG. 1A is a block diagram illustrating an exemplary wireless communication system 100 having a multi-port base station 110 (e.g., one with a multi-antenna transmitter) and a large number (only two shown: 120A and 120B) of multi-port receivers 120 (e.g., each including a multi-antenna MIMO receiver—a Multi-Input/Multi-Output receiver). The base station 110 is designed to couple to the receivers 120 by way of a wireless communications transmission space 115 susceptible to noise and/or interference. The design may be applied to a wideband transmission block protocol 104 wherein, conventionally speaking available ones of transmission block slots are each used to service receivers one at a time. However, as the number of receivers 120 in the cell area of the base station 110 grow, it becomes desirable to use beamforming for improving the signal to noise (SNR) performance and reduce multiuser interference of the system 100 so as to enable servicing of a large number of receivers 120 even though simultaneous transmissions in a same time-frequency resource unit of the protocol 104 can interfere with each other.

Ideally, any frequency column slot and/or time row slot in the transmission block protocol 104 (where 101 is the axis for temporal transmission slots and 102 is an orthogonal axis for constrained bandwidth transmission slots) should be usable for any receiver (e.g., 120A, 120B) no matter where placed within the respective cell area of the base station (BS) 110. However, the three-dimensional (3D) spatial channel environment can present different multipaths, reflections and noise conditions for each of the plural receivers such that each experiences different base station (BS) to receiver coupling conditions. In the diagram, the three-dimensional (3D) aspect of the communications channel is indicated to be a function of 3D location such as in a Xch, Ych, Zch spatial frame of reference. There can also be variations in channel behavior as a function of time, temperature, humidity and other environmental variables.

Ideally, any beam pattern slot along axis 103 in the illustrated transmission block protocol 104 should be usable for any receiver (e.g., 120A, 120B) no matter where placed within the respective cell area of the base station (BS) 110. However, the three-dimensional (3D) spatial channel environment (e.g., 115A—also channel_A, 115B—also channel_B) can present different multipath, reflection and noise conditions for each of the plural beam patterns for different locations of the respective UE such that each receiver (e.g., mobile terminal), when at different locations experiences different sensitivities to different beam patterns as used among the available columns of the transmission frequency slots axis 102. Ideally, the base station (BS) 110 would like use every available slot of transmission block protocol 104 for simultaneously transmitting to a large number of receivers (and also receiving back from them) by use of differential beamforming. However, practicalities, including signal attenuations within each frequency column may reduce the number of receivers that can simultaneously using a same frequency column slot down to just one per time/frequency slot. (Although not shown in the idealized transmission block protocol 104 of FIG. 1A, it is to be understood that a predefined protocol may mandate that certain slots carry control signals by way of which the base station (BS) 110 sends configuration commands and other instructions to the user terminals (UE's; e.g., 120A, 120B, etc.) of its cell area.)

From the viewpoint of each of the respective MIMO receivers (e.g., 120A, 120B) and due to their placements within the 3D channel environment, the electromagnetic linkage between the respective receiver and the base station 110' can be viewed as a respective user channel (e.g., 115A, 115B) having its own peculiar fading channel (e.g., for channel_A, channel_B, etc.) which attributes can change dynamically and rapidly relative to time. The respective MIMO receivers (e.g., 120A, 120B) are configured to each provide over time, feedback information signals (116 and 118) by way of wireless coupling back to the base station 110 regarding the nature of its respectively experienced user channel (e.g., 115A, 115B). The base station 110 can then adjust its internal workings (including that of defining its slot use scheduling plan) accordingly.

In the illustrated example 100, the base station 110 has a digital baseband precoding section 110A followed by an analog beamforming section 110B. The analog beamforming section 110B drives a plurality of RF antennas with respectively phased transmit signals, X1, X2, ... Xn to form corresponding beams of RF output energy. These beams are received at the respectively located MIMO receivers (e.g., 120A, 120B) by respective pluralities of receive antennas at each receiver and optionally phase shifted and combined after receipt in order to provide corresponding beam pattern sensitivity to the received beams. The respectively located MIMO receivers (e.g., 120A, 120B, etc.) also wirelessly feedback signals 118 and 116 to allow the base station to determine how to configure its analog beamforming selections 110B and its base band precoding configurations 110A, respectively for improved performance (including that of scheduling as many available slots as possible for providing multi-user transmission resources for simultaneous consumption by more than just one receiver if possible). The amount of information (overhead information) in the respective feedback signals 116 and 118 is respectively denoted as 116oh and 118oh. Different formats of feedback may be used for identifying the preferred RF transmit beam or plural beams per protocol slot in view of the allowed amount of overhead 118oh and in view of different ways of using the feedback information as will be described below.

Figure 1B:
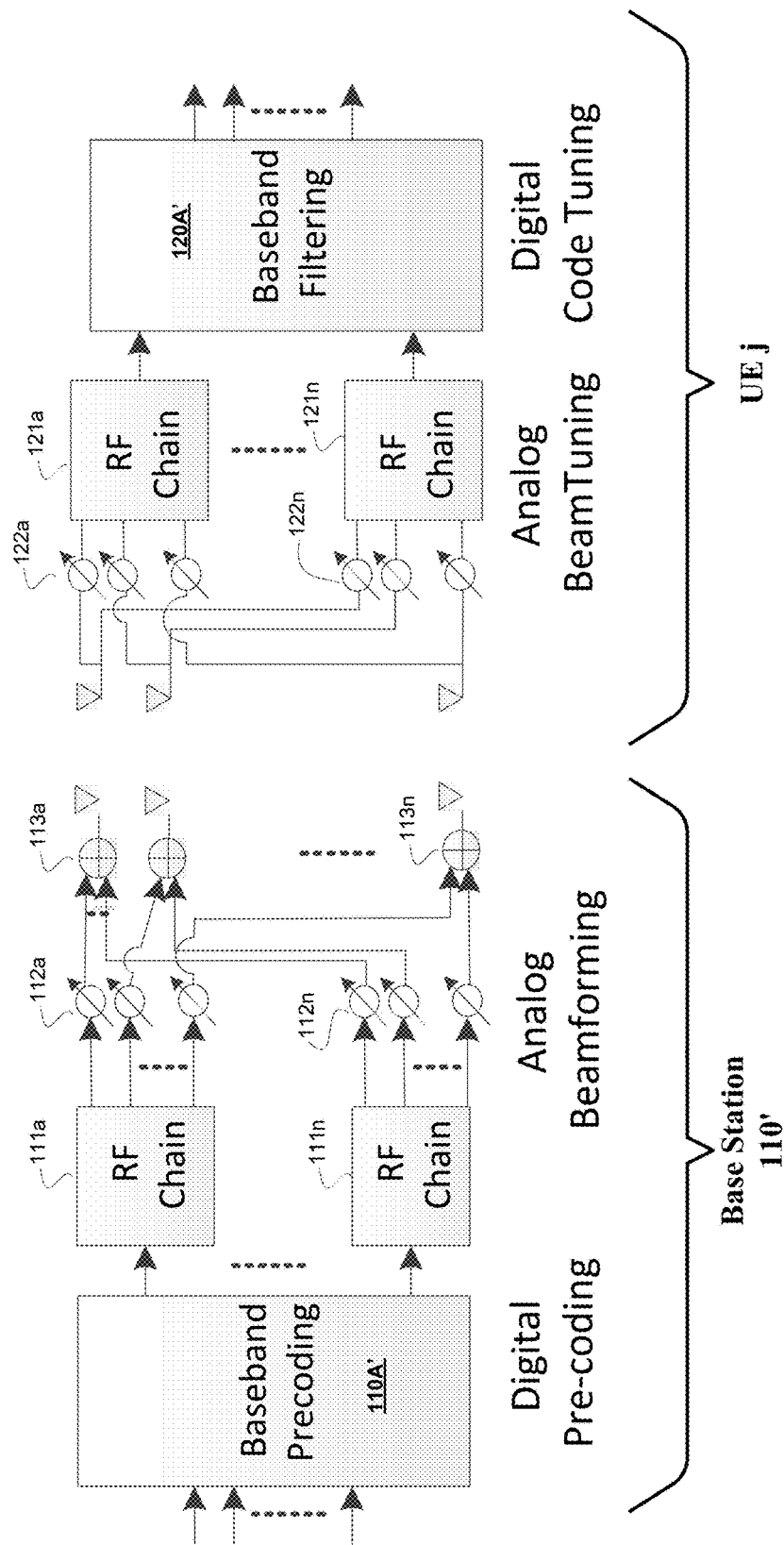
FIG. 1B is a schematic diagram showing in yet more detail hybrid design configurations for a base station (BS) and one of its serviced wireless terminals (UE).

FIG. 1B shows an exemplary embodiment 105 in greater detail. The base station 110' here includes a plurality of RF chain modules, 111a, 111b, ... 111n (not all shown) driven by digital signals output from the baseband pre-coding section 110A'. Each of the RF chain modules, 111a, 111b, ... 111n includes digital to analog converters (DAC's—not shown) for transforming input digital signal streams into corresponding output RF signal streams that are then applied to analog phase shifters. The baseband pre-coding section 110A' also outputs command signals for controlling the analog shift amounts of the respective analog phase shifters 112a, 112b, ... 112n (not all shown). Each of the respective transmit antennas has a corresponding phased signal combiner 113a, 113b, ... 113n (not all shown) for combining respective phase shifted RF signals from corresponding ones of the RF chain modules 111a, 111b, ... 111n. The combined phase-shifted excitations of the plural antennas may be used to generate differently patterned beams or beam patterns of output RF energy.

At the receiver end, for example that of the j-th user equipment module $UE_j$, another set of RF phase shifters 122a, 122b, ..., 122n (not all shown) feed respective phase-shifted versions of the received signals into corresponding RF chain demodulators 121a, 121b, ..., 121n (not all shown). The RF chain demodulators include analog to digital converters ADC's—not shown) configured to transform the demodulated RF signals into baseband digital signals. A baseband filtering section 120A' of the receiver then performs digital code tuning for extracting the digital signal information of the received RF beams. Each receiver can control its respective RF phase shifters 122a, 122b, ..., 122n and corresponding RF chain demodulators 121a, 121b, ..., 121n and so as to effectuate omnibus beam sensitivity or sensitivity tuned to one or more specific beams or beam patterns. The base station (BS) 110' may use control slots of the transmission block (e.g., 104 of FIG. 1A) to instruct individually addressable ones of its cell area receivers to effectuate omnibus beam sensitivity or sensitivity tuned to one or more specific beams or beam patterns.

Figure 1C:
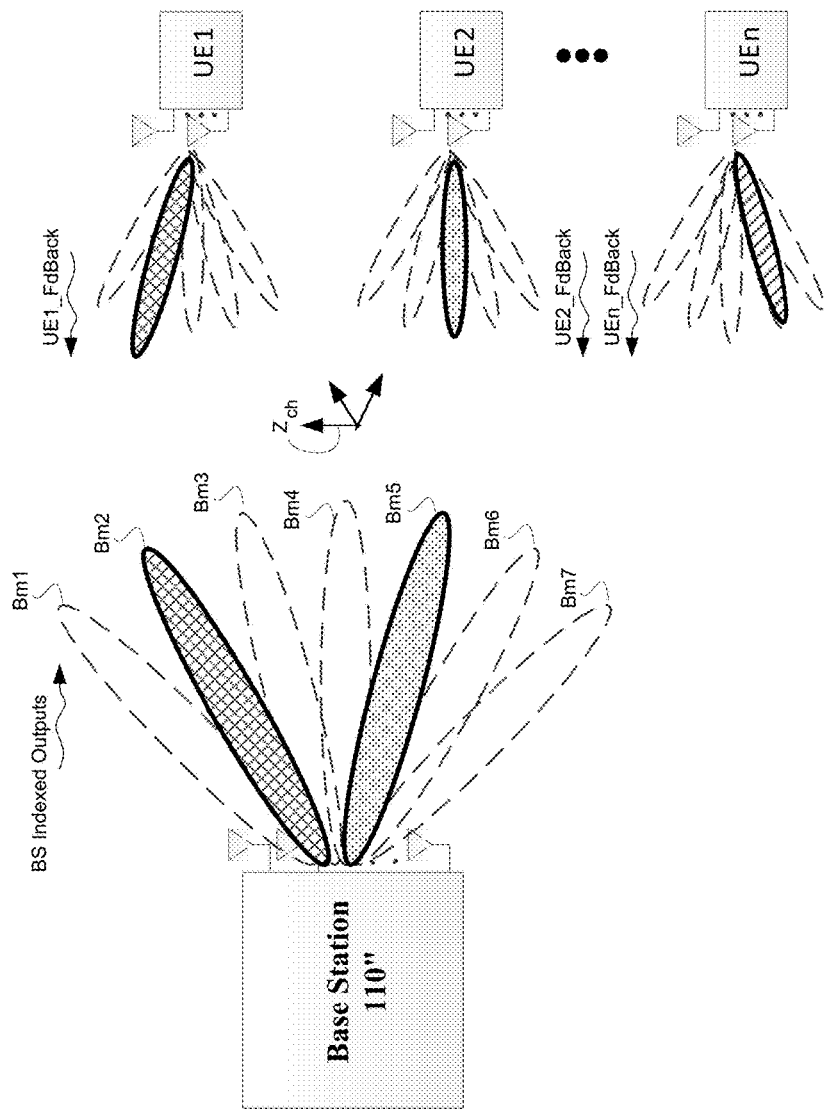
FIG. 1C is a schematic diagram showing how differential beam forming can improve SNR and mitigate interference between multiple MIMO receivers serviced by a same base station (BS).

Referring to FIG. 1C, shown is one embodiment 106 where the base station 110" sequentially indexes through individual ones of RF beams or beam patterns, Bm1, Bm2, . . . , Bmn producible by its respective antennas while the user equipment modules UE1, UE2, . . . , UEn in the cell area of the base station are in a beam-training initial mode (as opposed to a secondary, channel-training mode described later below). Each UE wirelessly transmits back to the base station a corresponding feedback signal (e.g., UE1_FdBack) indicating in one way or another, which one or more of the indexed RF beams or patterns thereof (Bm1, Bm2, . . . Bmn) was received as either the best or one of the top most N (e.g., N=1, 2, 3, . . . ) powerful and/or highest SNR signals and optionally indicating a channel quality indicator (CQI) at least for the received RF beam that is identified by the receiver as best or one of the better ones and/or identifying specific beam patterns each associated with respective ones of the N top best transmit RF beam or pattern detected by the receiver. In one embodiment, if each of the different UE's reports back a respective different RF beam or non-overlapped beam pattern (one that is not reported by any of the other UE's as their best) as being strongest or otherwise best, then the base station 110" automatically maps the respectively strongest and non-overlapped beam/pattern reported by each UE to that corresponding UE.

Figure 2:
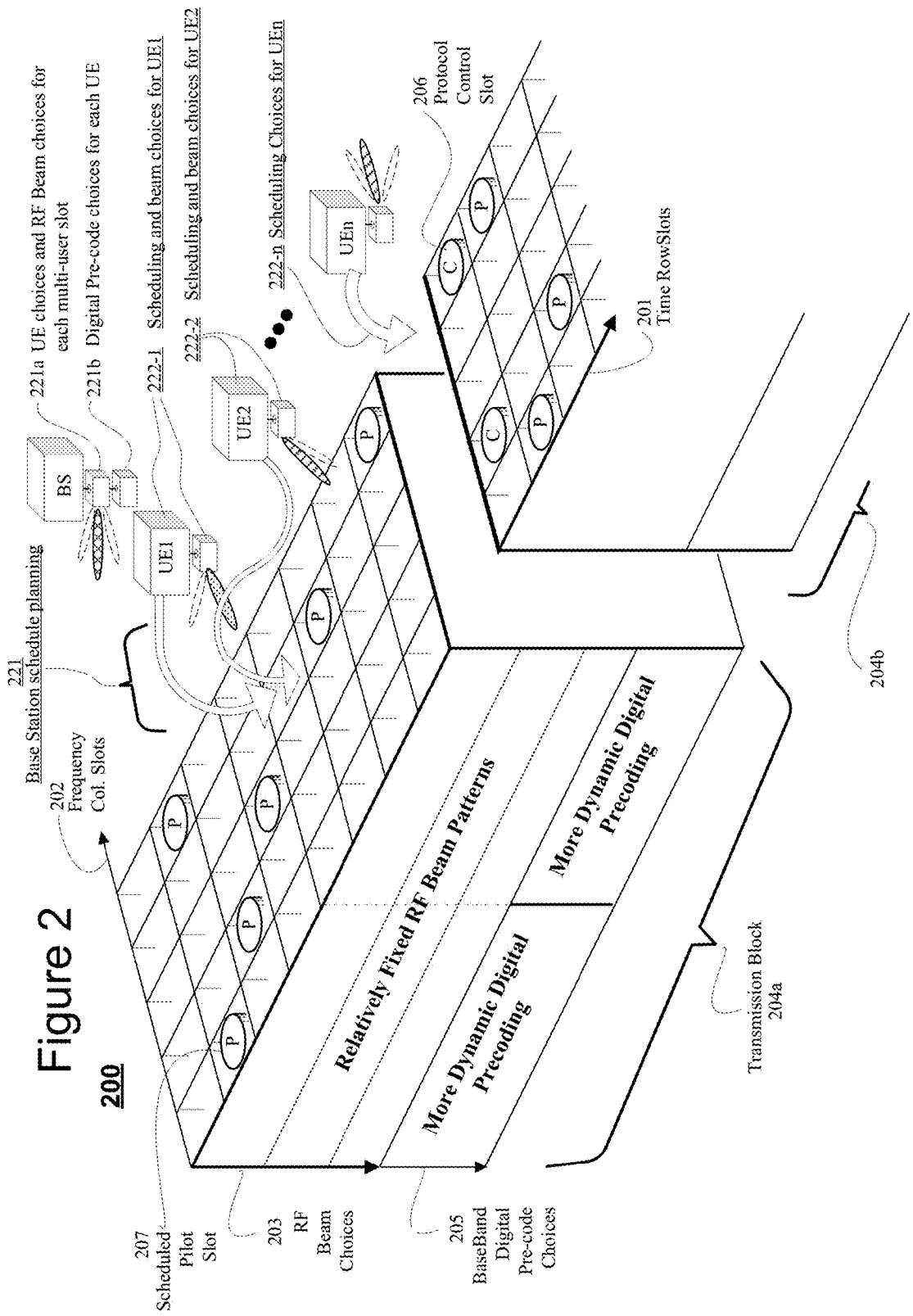
FIG. 2 is a perspective diagram showing how differential RF beam forming, dynamic digital fine tuning, and multiplexing in one or both of frequency domain and time domain can be used.

Referring to FIG. 2, shown in a three-dimensional perspective view is an illustration of how the base station may allocate scheduling of signal transmissions to the respective UE's such that plural UE's can simultaneously use a same frequency/time slot while avoiding excessive interference by use of different beam patterns (whose identities are placed along axis 203). In the 3D representation of the transmission space 200, axis 201 is the temporal row slots axis and axis 202 is the frequency column slots axis. As those skilled in the art may appreciate, frequencies may drift away from protocol ideals due various effects including Doppler shift and temperature effects. Accordingly, so-called, "pilot" signals (shown as "P" inside an ellipse) are inserted into various slots of the transmission block 204a by the base station (BS) and used by the receivers to lock onto the current frequencies output by the BS. Although not shown in the first block 204a, some further slots may be dedicated to supporting control signals where typically the control signals, "C" 206 of second illustrated block 204b will be placed in one of the first temporal row slots of the block for defining how later placed temporal row slots and/or frequency column slots are to be used. Yet other slots of the protocol structure may be made available for transmitting respective signals to respective ones of the active UE's in the cell area and receiving signals back from them. A single such F/T slot may simultaneously service two or more UE's if the base station (BS) is capable of forming a respective two or more beam patterns that can be respectively recognized and discriminated between by the slot sharing UE's as being respectively directed only to them. The base station (BS) will first try to create a configuration where each slot that is available for BS-to-UE operative signal transmission will support plural UE's rather than just one UE. However, if that cannot be done, the BS may be reduced to scheduling only one UE per available slot, where that configuration provides a minimum rather than larger and more desirable throughput capability. (See briefly the throughput axis 302od FIG. 3.) Scheduling over time of shared slot usage can be based on differential RF beam forming for the different UE's and on dynamic digital fine tuning for the different UE's so as to improve SNR and to mitigate interference between multiple MIMO receivers serviced by a same base station (BS).

The here-described systems use a two step training process. In the first training process step (the RF beam training mode), the base station transmits protocol defined or otherwise specified pilot signals using analog-formed different transmit RF beams and then the UE's each return feedback identifying at least one of the pilot signals and/or transmission slots (meaning which of the corresponding RF beams) were detected as the strongest with or without the information on how well they were received. Based on the reports from all users that might be sent at different time instance from the UE, the base station then responsively selects one or more of its analog-formable RF beams to use in a respective one or more of the F/T slots and selects the respective user terminals that will use respective ones of the selected beams. In one embodiment, the base station (BS) informs each of the selected user terminals (UE's) of its decisions using control signaling slots 206 of the transmission blocks (e.g., 204a, 204b).

In the second training process step (pre-code training, also referred to as channel training), the base station sends the pilot signals again, this time using the selected best beams. In response, each selected UE now performs its local channel estimation operations and returns further feedback to the base station (BS) providing the corresponding channel characterization information. In response, the base station then configures the digital precoding for each UE based on UE feedback provided in the second training process. Then the base station (BS) formulates a scheduling plan that includes the adaptive pre-code configurations and communicates that to the UE's of its cell area by way of control signaling slots (C 206) included in its transmission protocol. After that, the base station (BS) can commence with operative signal transmissions using the analog-wise formed and selected beam patterns and the digitally configured pre-codings.

As shown in FIG. 2, if, in developing a plan for possible simultaneous sharing of slots, the base station succeeds in assigning plural user terminals such as UE1 and UE2 to a same F/T slot, that means these terminals are to simultaneously share the resources of the assigned F/T slot while the developed scheduling plan is in force. (A default plan is one that assigns only one UE per slot and thus achieves a suboptimal throughput.) To achieve possible simultaneous multiuser transmissions, the process 221 is indicated in part by sub-step 221a of FIG. 2 for making the time domain RF beam selections. Additionally, the base station controller also selects the plural user terminals that will potentially share the slot when selecting the RF beams or beam patterns that will be used by the selected user terminals (e.g., UE1 and UE2). After identifying the respective beam patterns that are to be used for a certain period (following beam training), the base station may then assign respective shorter update intervals for each of the user terminals in which dynamic fine tuning (channel training) of the respective digital pre-coding processes to be used for each of the user terminals is to be performed at the base station so as to further mitigate interference between signals for co-scheduled user terminals via instantaneous channel conditions. It is to be understood that slots which are not each scheduled to support one, two or more user terminals (e.g., UE1 and UE2) can be instead scheduled to provide other functions including, but not limited to, each respectively transmitting a pilot signal (P); or transmitting a control signal (C).

In the illustrated sidewalls of the respective transmission blocks (204a, 204b) it is indicated that the RF beam pattern choices are relatively fixed while changes to the digital pre-coding choices changes more often in response to instantaneous channel conditions. Prior to operative transmissions, a guard time period and/or a processing time period might be needed for giving the base station time to change the RF beam patterns as conditions change (e.g., when serving different sets of users). Since the RF beam patterns are analog-formed beams formed by combined RF chains, they will generally be fixed over the used range of frequencies used per time slot in the scheduling plan. However, the analog-defined RF beam patterns can be changed more frequently if the guard time period and/or processing time period can be made relatively short. On the other hand, the digitally-performed precodings can be rapidly changed to provide base band fine tuning in the frequency domain as the corresponding channel conditions vary in the frequency domain (for example due to Doppler shifts). A variety of different base station processes may be used, each with its respective advantages and disadvantages in terms of sum signal throughput (e.g., axis 302 of FIG. 3) to all the selected user terminals (UE's), number of RF chains needed and amount of feedback overhead.

Figure 3:
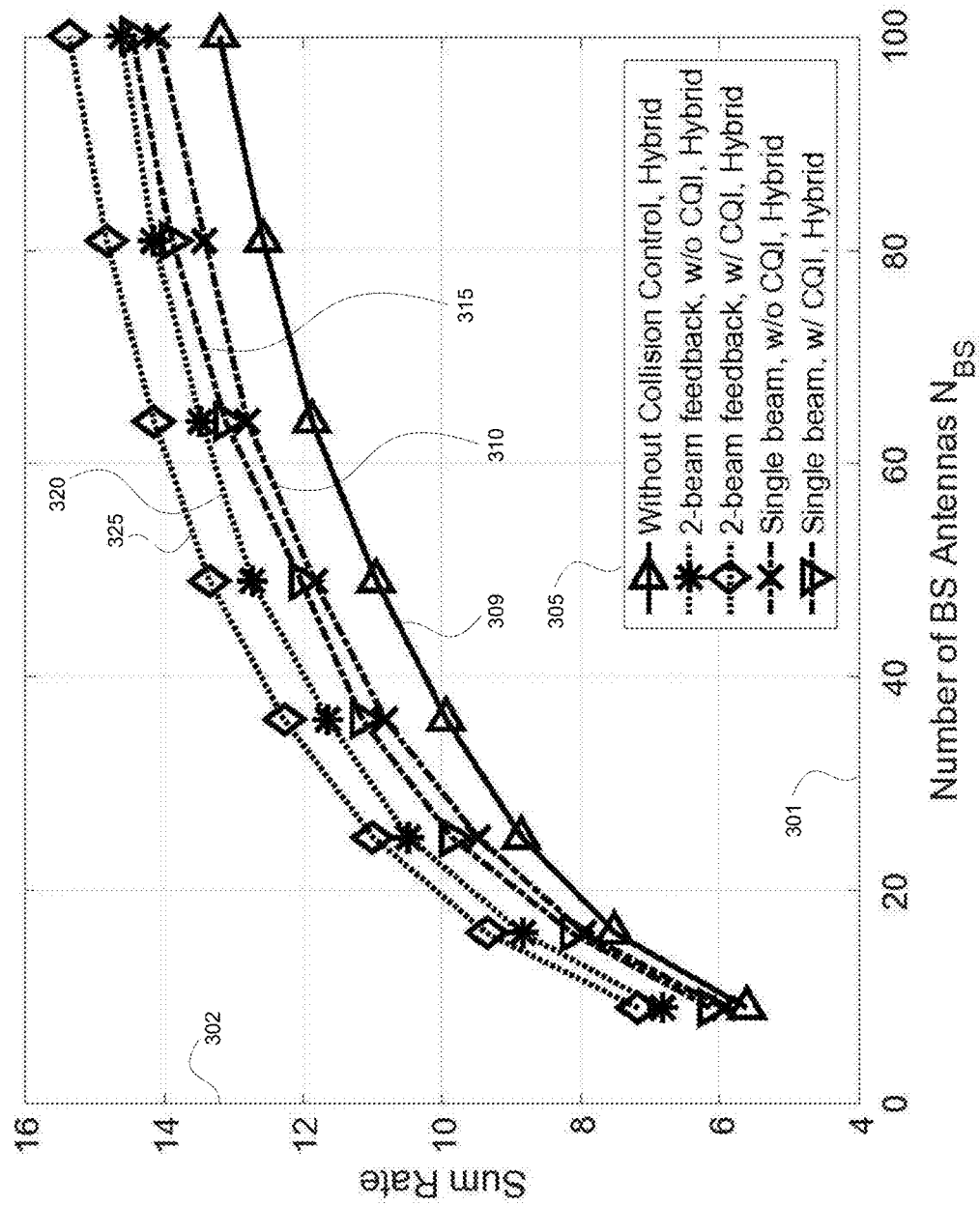
FIG. 3 is a results graph for total throughput (sum rate) for plural receivers operating using different feedback options and beam configurations.

Referring to the multi-plot graph 300 of FIG. 3, shown are a number of computer simulation results for sum throughput (in terms of bits per second per Hz) versus number of antennas at the base station. The horizontal axis 301 indicates the number of base station antennas $N_{BS}$. The vertical axis 302 indicates the sum throughput rate. The legend for the utilized plot symbols is shown at 305. As may be understood, best results for sum throughput rate are represented by plot 325 where the latter includes a feedback indicating the top best two of transmit RF beam patterns by each active user terminal, while providing channel quality information (CQI) for each of the top two selected beam patterns and while operating in a hybrid mode of relatively fixed analog beamforming and more rapidly adaptive digital pre-coding. Plot 309 provides a reference curve for hybrid operation but without any process that attempts to avoid beam pattern collision. Plot 320 depicts the results where each user terminal identifies its top best two transmit RF beam patterns as received from the base station but does not provide corresponding CQI feedback. Plot 310 depicts the results where each user terminal identifies only its top one transmit RF beam pattern from the base station and does not provide corresponding CQI feedback. Plot 315 depicts the results where each user terminal identifies only its top one transmit RF beam pattern from the base station and also provides the corresponding CQI information for that identified RF beam pattern. It is to be noted that the better performing plot 325 represents the results where each user terminal identifies its top two transmit RF beam patterns from the base station and also provides the corresponding CQI information for each of those top two identified RF beam patterns.

Referring next to FIG. 4 and the procedures 400 depicted there for serving multiple UE's simultaneously using hybrid beamforming, entry into the process may be made at 401.

At step 402 the base station broadcasts to all the user terminals (UE's) potentially present in its cell area a sequence of transmissions including plural transmission blocks according to a predefined or control signal specified protocol having F/T slots filled with pilot signals where the pilot signals are repeatedly transmitted using different RF beam patterns (each of which is repeatedly transmitted, optionally with different discrete signal strengths) such that all the active user terminals in the cell area can potentially receive the different, but each repeated, beam patterns (optionally output with different ones of discrete signal strengths), and can evaluate the strength and other optional parameters (e.g., CQI) for each of its received RF beams, and can report back to the base station as to which of the detected transmit beam patterns constituted a top N better ones of the detected beam patterns in terms of at least one of signal strength and other signal receipt metrics, where N is a predetermined whole number such as 1, 2, 3, etc. (The signal receipt metrics may include statistically derived metrics such as best average signal strength overtime and/or certain frequency slots and/or best average signal quality (CQI) over time and/or certain frequency slots.)

In step 403, each active user terminal (UEj) in the base station cell area is programmed to receive the sequentially transmitted pilot sequences having different beam patterns (and optionally different transmission strengths) and to measure detected ones of those transmitted pilot sequences with respect to local signal strength and/or other receipt metrics (e.g., CQI) of each locally detected transmission. As explained below in more detail, not all UE's will necessarily receive all of the transmitted pilot signals due to excessive attenuation in high frequency bands, multipath effects and/or reflections.

In step 404, each participating user terminal automatically processes the pilot signals which it did detect and categorizes them in accordance with at least one of relative signal strength at the receipt site, absolute signal strength at the receipt site and signal quality at the receipt site (e.g., CQI).

At step 405, each participating user terminal reports back by way of a prescheduled slot in the transmission protocol (e.g., a control signal transmission slot) the results of its signal processing operations. As indicated above, the amount of feedback information wirelessly reported back to the base station (BS) will increase the signal overhead of feedback sent from the user terminal to the base station. In a minimalist operation, each UE reports back only an identification (e.g., a pre-specified numerical index) identifying the transmit RF beam or beam pattern that the respective UE received as being its locally strongest beam or beam pattern. If a more informative feedback operation is employed, each UE may report back more detailed information such as which identifiable beams or beam patterns constituted the top N strongest received ones for each pilot occupied slot in the F/T protocol transmission block. If a yet more informative feedback operation is implemented, each UE may additionally report back further metrics such as quality of each received signal (e.g., CQI) or the average and/or the summed results of each pilot signals transmitted via each of the preferred beam pattern in the feedback report occupying certain time frequency resource.

In step 406, and depending on which feedback implementation is utilized, the base station (BS) processes the received feedback reports of the responding user terminals (UE's) and based on these, identifies for itself the set of unique beams or beam patterns from the beams in all the feedbacks, where a set of unique beams means that no two beams in the set are exactly identical to one another in at least one sense, and then selects a first subset of beams from the set of identified as unique beams, where that first subset is to be used for channel training. The base station (BS) also selects from the set of all responding terminals a subset (second subset) of user terminals (UE's) that are to participate in the channel training while using the selected first subset of beams or beam patterns from among the discovered unique set of beams.

Step 407 represents an operation that may occur during the channel training of the selected second subset of user terminals. By using at least one of uplink sounding (e.g., in TDD system) and UE feedback (e.g., in FDD system), the BS obtains corresponding downlink channel information generated in response to the first subset of selected training RF beam patterns from the second set of under-training UE's.

In step 408, with the corresponding downlink channel data, the BS generates corresponding digital baseband precodings for the selected RF beam patterns of the first subset for use with the respective UE's of the second subset when transmitting post-training operative data. In one embodiment following this step, the BS can further down select (reduce the number of) the RF beams picked for the first subset and/or further down select (reduce the number of) user terminals picked for the second subset to thereby reduced the membership numbers of the first and/or second subsets so as to thereby keep only the more optimal ones of patterns from the first subset of training RF beam patterns for use with respective more optimal ones of terminals of the second subset of under-training UE's. The base station (BS) can then generate corresponding and even more fine tuned digital baseband pre-codings for the down selected RF beam patterns of the respective down selected UE's.

In step 409, after the optimized RF beam patterns and their correspondingly optimized digital baseband pre-codings have been selected, the base station (BS) generates a transmission scheduling matrix which defines which UE's will share which F/T slots in the normal (operative, post-training) transmission block operations, which RF beam patterns will be used for the slot sharing UE's in a manner which minimizes chance of signal collision and which digital baseband pre-codings will be used for each of the UE's in order to optimize signal quality in view of extant channel conditions experienced by each of the UE's. The base station (BS) uses the control signals to instruct those of the UE's which have been selected for simultaneous shared use of one or more of the F/T slots as to the identifies of those slots and the identifies of the respective beams or beam patterns that the respective UE's will tune in for and the identifies of the respective pre-codings that the respective UE's are to digitally filter for (see again baseband filtering section 120A' of FIG. 1B). Others of the UE's which are not otherwise instructed may continue to operate as they had been beforehand.

Referring to step 411, since not all of the UE's may have been trained in steps 406-407 and instructed accordingly, a test is carried out in step 411 to determine if there are more subsets of unique beam patterns and/or more subsets of UE's to train. If yes, the process reverts back to step 406 for channel training yet more UE's. If no, the process advances to step 412 to determine whether it is time to repeat the entire sequence (e.g., to reset, to give UE's new to the cell area a chance at shared slot use, etc.) because changed conditions (e.g., new UE's have entered the cell area, old UE's have left, new interference sources have appeared, etc.). If yes, the process reverts back to step 402. If no, a loop back is made to step 409 where the current scheduling matrix is maintained.

Referring to FIG. 5, shown is a flow chart depicting a method 500 for selecting transmit RF beam choices and user terminals in response to single beam identifying feedback without feedback of signal strength or scheduling weight imposed at the base station. More specifically, entry into the process may be made at step 501. In step 502, after the base station has instructed a plurality of user terminals in its cell area to receive a sequence of beams or beam patterns transmitted from the base station (for example using F/T slots occupied by Pilot signals) and after the instructed user terminals (UE's) have analyzed received ones of those beams or beam patterns according to one or more metrics (e.g., individual signal strength per temporal and/or frequency slot; average signal strength per one or more temporal and/or frequency slots; signal strength variance; signal to noise ratios; signal quality (CQI) and so forth), the instructed user terminals send back indications of one or more of their localized analysis results as feedback to the base station (BS). In one embodiment, and in order to minimize feedback overhead, each responding base station returns a single index value identifying an RF beam choice which produced the best receipt results (e.g., strongest signal) for the metric analyzed by that user terminal (e.g., UEj).

In step 503 the base station (BS) identifies the unique set of beam patterns based on the feedback reports from UEs as it is possible that for one beam pattern in one feedback report from a UE also appears in the feedback report from another UE. For each beam pattern in the unique set of beam patterns, the base station identifies the user or users that identified that beam pattern in their respective feedback reports. If one beam pattern in the unique set of beam patterns is preferred by two or more users, the beam pattern is called a colliding beam pattern.

In step 504, the base station determines whether the number of unique RF beams or beam patterns is greater than the number of RF beam patterns that it can generate at any one time by the base station. In one embodiment, this is determined by comparing the number of unique transmit RF beams versus the number of operable RF chains ($N_{RF\_BS}$) that the base station has available to it in supporting multi-user shared F/T slots. If the answer is No, then control passes to step 505b where the base station selects all the beams present in the unique beam set (set V). If the answer is Yes (meaning there are not enough available RF chains), then control passes to step 505a where the base station randomly selects a subset of the beams present in the unique beam set (set V) where the number of members in the selected subset matches $N_{RF\_BS}$ (the number of operable RF chains then available for supporting multi-user shared F/T slots).

In subsequent step 506, for each selected one of the unique set of transmit RF beams, the base station (BS) selects a corresponding user terminal (e.g., on a random selection basis) from the subset of user terminals or collided UEs that fed back that beam identification as identifying their best received beam or beam pattern.

In step 507, the base station (BS) schedules the channel training session by using the available slots for forming a to-be-transmitted RF beam array which identifies respective triplets of transmission block slot, beam pattern that is to be trained for and the to-be-trained user terminal. The identified transmission block slot may be a temporal row one or a frequency column one or a narrower identification of time ranges and frequency ranges (e.g., a single F/T slot). In subsequent step 508, the identified ones of the available slots are used for performing channel training for the respectively identified pairs of unique beam or beam pattern and corresponding user terminal (e.g., UEj, j being an integer in the range 1-U). In one embodiment, respective pilot signals having the corresponding unique beam or beam patterns are transmitted by the base station (BS) in the identified ones of the available slots for carrying out transmit side channel training.

Although the above-described process 500 only selects a subset of users for the selected beam patterns so that there will not be any collision, it is within the contemplation of the present disclosure that others of the user terminals and of the beams that were not selected in a first selection round can be selected for use in other time slots on a sequential basis. For example, in step 505*a*, instead of randomly selecting a subset of beams, alternatively, the base station can partition the unique beams into several subsets of $N_{RF,BS}$ or a predefined number of RF beams with or without overlap and select one of the subsets in turns (e.g., round robin turns), and consequently select the associated user set, for base band channel training according to its turn. Similarly, in step 506 for each selected beam in the selected RF beam, instead of randomly selecting a user terminal for the training among the users who fedback this same beam pattern, the base station can either configure one of the users in turns for different time slots for the channel trainings, or even configure all users for the channel training which then relies on the scheduling algorithms to select the appropriate users after baseband channel training.

Referring to FIG. 6, shown is a flow chart depicting a method 600 for jointly selecting transmit RF beams and user terminal made in response to single beam identifying feedback made with signal strength and/or scheduling weight metrics. More specifically, step 602 represents the end of an RF beam training session in which each responding user terminal has fed back a single beam or beam pattern identifying index together with actual values or tokens for the corresponding CQI and/or the base station has provided a scheduling weight for each user representing how long the user terminal has been waiting since last being serviced and/or what servicing priority level the user terminal is subscribed to.

In step 603, the base station (BS) determines which of the fed back indices are not unique (and thus identify colliding users of for each beam in the unique beam set).

In step 604, the base station (BS) determines if the number of the currently unique beam choices is larger than the usable RF chains in the base station or a predetermined maximum number of selected RF beams for baseband channel training. If the number of the currently unique set of the beam patterns is larger, control passes to step 605*a* in which the BS selects a subset of the non-colliding beams or beam patterns equal to or less than the number of currently usable RF chains or the predetermined maximum number of selected beams for baseband channel training. Preferably, the feedback information for the unique beams is sorted according to one or more of the additionally fed back metrics so that the BS first selects that pair of unique beam and corresponding user terminal which reported the most favorable one or more metric values such as the strongest signal strength, largest weighted signal strength, best attained transmission rate, largest scheduling weight, best CQI and so forth. Alternatively, if there are enough or more than enough currently usable RF chains, control passes to step 605*b* where the BS selects all of the unique RF beams reported by their respectively paired user terminals.

In step 606, and for the case where each selected transmit RF beam is a unique one, the base station (BS) pairs that transmit RF beam or beam pattern with its corresponding user terminal.

In step 607, the base station (BS) defines its channel training schedule using the selected pairs of identified beam and corresponding user terminal. Then in step 608, the BS performs the corresponding channel training.

Referring to FIG. 7, shown is a flow chart depicting a method 700 for transmit RF beam and user terminal selections made in response to at least some of the responding user terminals identifying two or more beams or beam patterns while not feeding back corresponding signal strength or scheduling weight.

More specifically, step 702 represents the end of an RF beam training session in which each responding user terminal has fed back one or more beam or beam pattern identifying indices but without corresponding values or tokens for the corresponding CQI and/or with a scheduling weight representing how long the user terminal has been waiting since last being serviced and/or what servicing priority level the user terminal is subscribed to.

In step 703, the base station (BS) first forms the unique set of RF beams from all feedback beams. Separately, in another stored set, the BS keeps track of candidate user terminals that have not yet received channel training and are thus awaiting their turn for such channel training. In step 704, for each RF beam in the candidate RF beam set, a count is made of how many candidate user terminals fed back that identified the candidate RF beam as their strongest or otherwise best choice, i.e., number of collisions on that RF beam.

Then in step 705, the BS selects a candidate RF beam that has the least number of candidate user terminals contending for channel training with that candidate RF beam (or beam pattern). Then in step 706, with the candidate RF beam having been chosen, the BS either randomly selects one of the associated candidate user terminals that identified that candidate RF beam or selects one of the associated candidate user terminals that not only identified that candidate RF beam but also had a fewest number of RF beam collisions for all the beams in the user's feedback report.

In step 707, the chosen pair of unique RF beam and candidate user terminal are removed from the respectively stored sets of unique RF beams and candidate user terminals. Accordingly the results will not be needlessly replicated in a next loop (note loopback path 710) of the process. In step 708, all the other candidate user terminals that chose that same RF beam selected in step 705 as one of their multiple choices are removed from the candidate user set.

Test step 709 determines whether if the number of selected beams reaches the number of base station RF chains or the predetermined maximum number of beams is reached, or if there no candidate user terminals still awaiting assignment for training with a corresponding beam or beam pattern. If the answer is no, loopback path 710 returns control back to step 704. Otherwise in step 711, channel training is performed based on the selected pairs of beam and user terminal.

Now a more detailed description on the methods and apparatus for the UE feedback and beam/user selection will be presented. In this section, the design of multiuser MIMO (MU-MIMO) is considered for large scale MIMO's (multi input/multi output terminals) employing hybrid beamforming in which a combination of analog radio frequency (RF) beams formed using phase-shift antenna arrays is combined with digital baseband precoding. Several approaches for RF beam optimization feedback are disclosed. The different beam training feedback methods have respective algorithms for the transmit side RF beam selection and for the selections of the user terminals that are to make use of the corresponding RF beam selections (for example in subsequent channel-training and then operative general purpose use).

In more detail, large scale antenna systems, or so-called massive MIMO (multiple-input multiple-output) systems, may provide promising advantages for next generation (e.g., 5G) wireless systems and thus allow for increased system capacity. However, in practice, implementing a large number of radio frequency (RF) chains is challenging and costly, particularly in the high frequency bands and if implemented with wide bandwidths. To overcome this issue, hybrid beamforming is proposed as providing a good tradeoff between the performance/flexibility and the cost. Hybrid beamforming combines phase-array antenna based beamforming (RF beamforming) with digital baseband signal processing to effectuate baseband beamforming or precoding. With analog RF beamforming, the number of RF chains needed for beamforming can be reduced as compared to digital RF beamforming. At the same time, analog RF beamforming can still achieve certain beamforming gains such as increasing the effective signal-to-noise ratio (SNR) of the wireless links. With baseband digital precoding the SNR can be further increased and interference can be reduced with precoding techniques that can improve multiuser MIMO (MU-MIMO) performance. When implementing hybrid beamforming, i.e., a two-stage beamforming process—one in the analog RF domain the other in the digital baseband domain, the RF beams to be used in each transmission slot are selected first with an RF beam training process before the baseband processing is carried out. After specific RF beams are selected, corresponding dynamical channel state information (CSI) can be captured via a second stage channel training process from either uplink measurement based on downlink/uplink reciprocity for time-division duplexing (TDD) systems or from user channel feedback in frequency-division duplexing (FDD) systems.

2. Overall System Model

Consider a downlink multiuser MIMO system with $M_T$ antennas at the base station (BS) and $M_R$ antennas at each user equipment (UE) or terminal. The signal vector received by user terminal k, is denoted as $\hat{y}_k$, and can be written as $$\hat{y}_k = H_k^\dagger x + n, \qquad (1)$$

where in Eq. 1, the complex matrix $H_k$ of size $M_T \times M_R$ is the channel gain matrix between the base station (BS) and the k th user terminal. Here, x of $M_T \times 1$ is the transmitted signal vector, n: N(0, I) is the additive noise vector, and the further symbology, $(\bullet)^\dagger$ denotes the matrix Hermitian. With multiuser MIMO linear precoding, the transmit signal may be given as:

$$x = V s, \qquad (2)$$

where in Eq. 2, s is the transmit data symbol vector.

For hybrid beamforming or hybrid precoding, two-stage beamforming may be employed which consists of an analog phase-array shifted RF beamforming process and a baseband digital precoding process. As shown in FIG. 1A, with hybrid beamforming, the MU-MIMO transmit precoding can be represented as $$x = F_{RF} F_{BB} s, \qquad (3)$$

where in Eq. 3, $F_{RF}$ and $F_{BB}$ represent RF beamforming matrix and baseband digital precoding matrix, respectively. With the notation B representing the number of RF beams, the RF beamforming can therefore be expressed as $$F_{RF} = [f_1^{RF}, f_2^{RF}, \ldots, f_B^{RF}], \qquad (4)$$

where in Eq. 4, $f_b^{RF}$ of $M_T \times 1$, $1 \le b \le B$ is the one configured beam with phase array switch, which will be transformed from one digital data stream to the analog signal by a digital-analog converter (DAC) with one RF chain.

For the corresponding baseband precoding, the following may apply:

$$F_{BB} = [f_1^{BB}, f_2^{BB}, \ldots, f_U^{BB}], \qquad (5)$$

where in Eq. 5, $f_u^{BB}$ of B×1, $1 \le u \le U$, is the baseband beamforming vector for the u th data stream among a maximum of U data streams. Assuming that there are $N_{RF,BS}$ RF chains in total, then based on the hybrid beamforming model, the following system design constraints at the BS side may be present:

$$B \le N_{RF,BS}, \qquad (6)$$

$$U \le B. \qquad (7)$$

More specifically, at the receiver end, assuming a single data stream allowed per user terminal and there being K user terminals, i.e., U=K, with receive beamforming which can also be a phase array based RF beamforming, the received signal at the baseband may be given by:

$$y_k = w_{k,RF}^H H_k x + n_k, \qquad (8)$$

where in Eq. 8, $w_{k,RF}$ of $M_R \times 1$ denotes receive RF beamforming. The received signal in (8) assumes a single RF chain with one received data beam. If each receiver has multiple RF chains, the signal vector after receive RF beamforming may be given by:

$$y_k = W_{k,BB}^H W_{k,RF}^H H_k x + n_k, \qquad (9)$$

where in Eq. 9, $W_{u,RF}$ of $M_R \times A_k$ are the respective receive RF beamforming matrices, i.e., $A_k$ receive RF chains of the kth active user in use, and $W_{k,BB}$ of $A_k \times S_k$ is baseband digital receive filtering, $S_k$ is the number of streams for user k among U streams served by the base station. Thus, $\Sigma_k S_k = U$. For receive side digital beamforming, at least one of: maximum ratio combining (MRC) and minimum mean-square-error (MMSE) filtering can be employed. Similarly as in the transmit side, the following constraints for receiver side beamforming, may apply:

$$S_k \le A_k, \qquad (10)$$

$$A_k \le N_{k,RF,UE}, \qquad (11)$$

where in Eq. 11, $N_{k,RF,UE}$ is the number of RF chains at the k-th UE.

With RF beamforming at both transmit and receive sides, the equivalent channels for single RF chain and multiple RF chains at the receiver end, may be respectively, given by $$\Box h_k = w_{k,RF}^H H_k F_{RF}, \qquad (12)$$

$$\Box H_k = W_{k,RF}^H H_k F_{RF}. \qquad (13)$$

If the base station processing system knows the equivalent channel after applying the transmit and receive RF beamforming for every user terminal, the base station processing system can then perform the baseband multiuser MIMO precoding with existing MU-MIMO linear precoding methods, e.g., zero forcing (ZF), regularized ZF methods, etc.

Here it is assumed for simplicity sake that each user terminal has only one RF chain. Thus for each user terminal, the equivalent channel is only a one column vector $\Box h_k$.

3 Multiuser MIMO with Hybrid Beamforming

The procedure to perform the multiuser MIMO with hybrid beamforming is described in Eq. 1 and is recapped here as follows.

{1} Given candidate RF beamformed sets $\mathcal{F}$ of size $2^{Q_{RF,BS}}$ and $\mathcal{W}$ of size $2^{Q_{RF,UE}}$ for the transmitter and receiver respectively, a first step is to perform first stage RF beam training. Each user terminal identifies the best transmit and receive RF beam pair which results in the highest signal power, i.e.

$$\{v_{k,RF}^*, g_{k,RF}^*\} = \arg\max_{\forall v_{RF} \in \mathcal{F}, \forall g_{RF} \in \mathcal{W}} \|g_{RF} H_k v_{RF}\|^2. \quad (14)$$

In one embodiment, an index identifying the best transmit RF beam $v_{k,RF}^*$ is then fed back to the base station, as indicated for example by 118 of FIG. 1A.

{2} Based on the user terminal feedback (e.g., 118), the base station then forms the transmit RF beamforming matrix $F_{RF}=[v_{1,RF}^*, \ldots, v_{K,RF}^*]$ and performs second stage training (channel training). Each user terminal estimates a corresponding equivalent channel matrix $h_k^* = g_{k,RF}^* H_k F_{RF}$ and feeds back the quantization of $h_k$ from a codebook $C_H$ of the size $2^{Q_{BB}}$, where:

$$\hat{h}_k = \arg\max_{h \in C_H} \|h_k^*\| \quad (15)$$

{3} Given the equivalent channel from all K user terminals, $H=[h_1, \ldots, h_K]$, available at the base station, the base station data processing portion then performs the baseband precoding such as ZF precoding $F_{BB} = H^\dagger (H H^\dagger)^{-1}$. After normalization, the baseband precoding for user k may then be implemented in accordance with:

$$f_{k,BB} = \frac{f_{k,BB}}{\|F_{BB} f_{k,BB}\|_F}.$$

The above described first procedure is not without problems. Firstly, different user terminals might have the same transmit RF beam chosen as their best selection due to the quantized availability of transmit RF beams. Such quantization is due to hardware constraints, e.g., antenna sizes and numbers/placement of them, cost, etc. There is also a tradeoff between the RF beam resolution and first stage RF beam training complexity. If there collision on the transmit RF beam due to same beam choice, it is not efficient to form the baseband precoding with the same transmit RF beam, which is rank deficient. Secondly, since there are two stages for the channel training and the second one is dependent on the first stage RF beam selection, for the user terminals that are not selected for training in the first stage, it is impossible to perform the user scheduling at the second stage for the same user terminals as the channel information for them is not available. On the other hand, the base station selection of UEs when forming BB precoding as K RF beams may not be able to support all K users if there are some collisions between the strongest transmit beam of a first user terminal and the second strongest transmit beam for another user terminal.

{4} Proposed Designs for MU-MIMO with Hybrid Beamforming

In a next stage of modeling for MU-MIMO with hybrid beamforming, considered are scenarios where the receiver is also equipped with analog RF beamforming. RF beamforming on the transmit side is desirable for wireless transmissions over very high frequency bands in which path loss for signal transmission can be very high. The receive side RF beamforming can further boost the effective signal strength to a certain level before digital baseband processing is undertaken. For relatively low frequency bands, the receive side RF beamforming may not be necessary and its elimination will simplify the training procedure. It is worth noting that since the receive side RF beamforming puts an additional constraint on the system, the here disclosed methods and protocols can be applied to the case without such constraints, i.e., no receive RF beamforming, or can be easily extended to such cases.

{4.1} Feedback of Signal Strength for RF Beams

During the first training stage, the feedback of the identification of the best transmit RF beam may not be sufficient for selection of non-overlapping transmit RF beams. It may be beneficial to have the user terminals also send back the combined signal strength or the channel quality per the following:

$$s_k(g_{k,RF}, v_{k,RF}) \triangleq \|g_{k,RF} H_k v_{k,RF}\|^2 \quad (16)$$

where the selected combination of transmit and receive RF beams is represented by $\{g_{k,RF}, v_{k,RF}\}$ and the strongest transmit RF beam index is also supplied by feedback. Note from Eq. 16 that the signal strength, $s_k$ as detected by the k-th user terminal can be measured for wideband signals. The information $s_k(g_{k,RF}, v_{k,RF})$ can be quantized based on signal strength level like the reference signal received power (RSRP) or based on an information rate, e.g., $\log_2(1+s_k(g_{k,RF}, v_{k,RF})/\sigma^2)$ where $\sigma^2$ is the receive noise variance after receive RF beamforming, similar to the channel quality index (CQI) in LTE systems. The number of quantization levels can be predefined in view of considering the feedback overhead. Since the best receiver RF beamforming is associated with the transmit RF beamforming, it is possible to drop the receive side RF beam in the notation of $s_k$ for notation simplicity, thus arriving at $s_k(v_{k,RF})$. With detection of return signal strength available at the base station for the selected beam from each user terminal k, the base station can select the user terminal with the strongest return signal strength among collided user terminals who reported the same transmit RF beams as their best, i.e., $$k^* = \arg\max_{\{k | v_{k,RF}^* = v \in F\}} s_k(v_{k,RF}^*). \quad (17)$$

In one embodiment, the joint user terminals selection for a shared resource (e.g., time/frequency slot) and resource allocation, i.e., MAC layer scheduling, is implemented with two stages in LTE systems or in general wideband OFDMA systems. In first stage, the time-domain scheduling determines the candidate users set from all active user terminals in service based on quality-of-service (QoS) constraint for user packet, wideband channel quantity, and past delivered data throughput or average data rate. Then with a reduced user set based on the first stage discrimination, the frequency domain scheduling is performed to allocate the frequency resources to different users based on the channel quality of the subchannels in frequency domain. For hybrid beamforming, the instantaneous channel is not available when performing transmission beam and user selection at the first stage. It becomes difficult to perform user terminal selection based only on the strongest transmit RF beam index. However, with the return signal strength or CQI feedback, $s_k(v_{k,RF}^*)$ being also provided, the base station is able to perform the time domain user selection using similar metric as the time domain scheduling for current LTE system. For example, considering the proportional fair scheduling with a weight $\alpha_k$ for user k where $\alpha_k$ is the priority of the user k, and can be determined based on the average user throughput $\bar{R}_k$, e.g., $$\alpha_k = \frac{1}{\bar{R}_k},$$

or the data amount already serviced to the user k, the base station can schedule the user terminals within the transmission block protocol using the weighted signal strength $\alpha_k s_k(v_{k,RF}^*)$ to select RF beam and the corresponding user terminal for the next stage channel training, per e.g., $$k^* = \arg\max_{\{k|v_{k,RF}^* = v \in F\}} \alpha_k s_k(v_{k,RF}^*). \quad (18)$$

The return signal strength can also be used for transmit RF beam selection if there are large number of user terminals and a limited number of RF chains available for forming of different beam patterns. The base station can select the transmit beam pattern based on the order of the returned signal strength $s_k(v_{k,RF}^*)$, which will be discussed below.

Before utilization of the ultimately selected transmit and receive side RF beam patterns, the signal strength may be very low for high frequency bands. In such a case, the feedback information may be first sent back without use of RF beamforming at the user terminal end. In one embodiment, the feedback signal is modulated with long spreading codes. This signaling of additional information to the base station will increase feedback overhead. Sharp beamforming may be employed for low mobility user terminals, where the selected RF beam pattern for each user terminal will not change too fast because the channel between it and the base station (BS) is not changing too fast. If the used RF beam is relatively wide, the selected RF beam will not change frequently either. Thus the results of the RF beam training and the feedback are used over a much larger time scale than are the results of the baseband precoding and training process. In other words, RF beam patterns choice is maintained in a longer time interval than instantaneous channel acquisition. In this sense, the extra feedback overhead for providing the return signal strength and/or quality is not large.

{4.2} Feedback of Multiple RF Beams

In urban areas, it is often the case that the base station egress signals and terminal return signals propagate through multiple paths due to reflection or diffraction. Multipath channel effects are also acute for transmissions over high frequency bands in the tens of gigaHertz range. However, the number of useful propogation paths for high frequency bands tends to be substantially less than that for lower frequency bands, i.e., in the sub-6 GHz range, due to large path losses and penetration losses in the high frequency bands. Therefore, in order to compensate for the possibility of excessive signal loss in some bands or paths and/or mitigate the possible interference, each UE should try to feedback to the base station (BS) respective multiple indices identifying respective multiple ones of received strong transmit RF beams instead of feeding back just one RF beam index identifying only the strongest one of its received transmit RF beams.

In one class of embodiments, the determination of which of the received transmit RF beams should be reported back as the strongest ones includes defining a signal threshold $s_{th}$. With the first stage RF beam training, the user terminal feeds back the identification of the transmit beams that are greater than this predefined threshold, i.e., the transmit beam $v_{RF}$ is fed back, if $$s_k(v_{RF}) \geq s_{th}, \ v_{RF} \in F_{RF}. \quad (19)$$

In another class of embodiments, a definition is made of a threshold in the difference gap between the identified strongest received signal strengths of all transmit and receive RF beam pairs. For example, define $\Delta_{s,th}$. The user terminal then sends the index of the next strongest transmit RF beam if the received signal strength after the best received RF beamforming is above the strongest signal strength with the offset $\Delta_{s,th}$, accordingly the condition is provided where:

$$s_k(v_{k,RF}^*) - s_k(v_{RF}) \geq \Delta_{s,th}, \ v_{RF} \in F_{RF}. \quad (20)$$

The user terminal accordingly feedbacks the information of the respective transmit RF beams $v_{RF}$ satisfying inequality Eq. 20 back to the base station.

To recap, as a first step, the identification of the best (strongest received) transmit RF beam can be fed back by default from the respective UE to the base station (BS).

However, to limit the feedback overhead, the network can configure or predefine the maximum number of the transmit beam identifications to send back. After receiving a base station (BS) sequenced set of transmit RF beams or beam patterns, the user terminal determines the strength of each and then orders the transmit beams that satisfy the signal threshold conditions of either of Eq. (19) {threshold based} or Eq. (20) {gap based} or both.

Once the determination is made for the number and identification of the transmit beams for which feedback is to be provided, a further determination can be made as to the contents of the feedback information.

In one embodiment, the user terminal sends back only the indices identifying the selected RF transmit beams and not in any particular pre-specified order. In this case, the base station does not have knowledge of which of the identified beams is strongest, weakest or in between and thus has to treat them equally. For such feedback contents, the transmit beam index can be sent one by one, with the natural order of index. If the number of feedback transmit RF beams if fixed, e.g., M beams, the indexes can be coded with a combinatorial index r as follows $$r = \sum_{i=1}^{M} \binom{d_i}{i}, \quad (21)$$

i.e., the summation of binomial coefficients of $d_i$ and i, where in Eq. 21, $d_i$ is the ordered index of the i th beam, $d_1 < d_2 < \ldots < d_M$, and i is the index of the beam in the report, i=1, ..., M. The above coding method can be similar to that used in best-M subband CQI feedback in LTE systems. A reverse indexing can be performed with the following procedures. Assume the total number of RF beams is N. Start with received r, then:

For i=M, . . . , 1,
  Find $\hat{d}_i$ that is the largest $d \in \{i, i+1, \ldots, N\}$ which satisfies $$r - \binom{d}{i} > 0.$$

Update $$r \Leftarrow r - \binom{\hat{d}_i}{i}.$$

The complexity of the reverse indexing approach can be reduced if more efficient methods are used such as, e.g., bisection search instead of exhaustive search from i to N for each index.

Alternatively, the user terminal may send the indices of its selected best RF transmit beams in the order of their respective, receiver side signal strengths. The base station then knows which is the strongest, weakest and in between. The order of RF beams can be specified for each transmit beam or a group of transmit beams. For example, it is possible to define multiple thresholds, e.g., $s_{th,g}$, $\Delta_{s,th,g}$, $g=1, \ldots, G$, for the conditions specified in Eq. (19) or Eq. (20), thus providing for multiple (G) groups of beams which satisfy different levels of constraints. In one embodiment, it may be desirable to not differentiate the transmit beams within one or more of the groups, G in which case, for each such group, the indices are fedback without the order information.

In an alternate embodiment, the user terminals (UE's) can feed back the identifications of their selected RF transmit beams along with corresponding and specific signal strength information where the specific signal strength information can be in the form of indices identifying predetermined strength ranges or normative strength percentages or the specific signal strength information can be in the form of absolute values indicating signal strength at a predetermined degree of precision (e.g., in logarithmic format).

It is to be noted that the above described approaches are generally for transmit signals that could have many propagation paths. Also it is worth noting that for the wireless transmission in high frequency bands, due to the large signal attenuation over distance attributed to such bands, there will usually not be many paths through which the transmitted signals can be detected by one or more of the UE's. Thus the feedback will not include excessive information relating to excessively attenuated paths and the amount of feedback information will be constrained to only the propagation paths that get through. Feedback information for two or three transmit RF beams might be good enough to allow the base station (BS) to determine possible interferences within the transmission space and to select the best transmit RF beams for use in base band channel training.

{4.3.1} Single Beam Feedback

A collision for a transmit RF beam is defined if two or more user terminals feedback the identification of that RF beam as their respective best one. If the possibility of collission for a transmission to different user terminals (e.g., in different transmission slots) is not an issue or can be ignored, then the base station (BS) may define its RF beamforming matrix based on the individual UE feedbacks, i.e., select all the feedback identified RF beams, even if the chosen transmit RF beam indices (identifications) from two user terminals are the same. On the other hand, if the possibility of RF beam confliction is an issue, i.e., when two or more user terminals (UE's) feedback the same transmit RF beam identifications as their best received ones, then a more sophisticated defining of the base station (BS) RF beamforming matrix is needed.

For the case where each UE feeds back an identification of a single transmit RF beam (e.g., best index), the selection of transmit RF beams is described as follows. First the base station (BS) finds all the unique (not duplicated ones) of the identified transmit RF beams to fill into the transmit RF beamforming matrix. As a result, the number of selectable transmit beams for each given time and/or frequency slot is less than the total number of user terminals that may want to receive a transmission within that given T/F slot. The base station (BS) next determines which user terminals to select for second stage training (channel training). For each given transmit RF beam, if that given transmit RF beam was selected (identified as best) by only one user terminal, the given transmit RF beam (or beam pattern) is assigned to that one user terminal. On the other hand, if the given transmit RF beam was reported as best (collided on) by the feedbacks of two or more then active user terminals, and the base station (BS) does not have corresponding signal strength feedback, the BS then randomly (or pseuedo randomly) selects a user terminal or selects the user terminal based on a time-domain scheduling metric, e.g., the weight $\alpha_k$. On the other hand, if the base station (BS) has knowledge of the signal strength of the identified transmit RF beam for each user terminal that collides over that one as its best, then the BS selects the user terminal reporting the highest received signal strength $s_k(v_{k,RF}^*)$ or the highest weighted signal strength $\alpha_k s_k(v_{k,RF}^*)$.

The above described first approach assumes that the number of RF chains in the base station (BS) is equal to or larger than the number of currently active user terminals and thus a sufficiently large number of unique beam patterns can be generated by the base station. However, if the currently active user pool size is larger than the number of RF chains available in the BS, a modified strategy has to be devised for shared utilization of the selectable RF beams among the larger number of user terminals as based on all the user terminal feedbacks. For single beam identification feedback, if there is no feedback of the signal strength, the method first identifies the subset of unique RF beams, $\tilde{\mathcal{V}}$, from all the fedback transmit RF beam identifications from all the user terminal feedbacks. If the subset size $|\tilde{\mathcal{V}}| \geq N_{RF,BS}$, then the process can randomly select $N_{RF,BS}$ transmit RF beams from the larger number available in subset $\tilde{\mathcal{V}}$. If on the other hand, $|\tilde{\mathcal{V}}| < N_{RF,BS}$, then all the number of RF beam identifications in the subset of unique ones $\tilde{\mathcal{V}}$ are selected. For each selected beam, the base station assignment method randomly selects a user terminal from among the set of user terminals who fed back this beam identification (e.g., beam index).

In the case of an alternate embodiment, where a scheduling weight $\alpha_k$ or a signal strength $s_k(v_{k,RF}^*)$ is available, the process for beam to user terminal to F/T slot assignment can be $\alpha_k$, $s_k(v_{k,RF}^*)$, or a weighted one $\alpha_k s_k(g_{k,RF}^*, v_{k,RF}^*)$. Again, the process first identifies the unique ones of the fedback transmit RF beam identifications, $\tilde{\mathcal{V}}$. For each beam in this set of unique ones $\tilde{\mathcal{V}}$, the base station (BS) first selects a user terminal with the largest selection metric value among all user terminals who feed back this same beam identification. The corresponding metric becomes the metric for the beam associated with the selected user terminal. If $|\tilde{\mathcal{V}}|<N_{RF,BS}$, all beams are selected. The user terminals associated with those beams are then selected for the second stage training. If $|\tilde{\mathcal{V}}|\geq N_{RF,BS}$, the process first orders the beams in $\tilde{\mathcal{V}}$ according to the weight and/or signal strength metric of the beam. It then first selects $N_{RF,BS}$ transmit RF beams with the larger metrics, consequently, the user terminal associated with each selected beam is the one with the largest corresponding metric.

4.3.2 Multi-Beam Feedback

Next, consideration is made for the case of feedback of multiple RF beams and corresponding algorithms are provided for accordingly dealing with such cases. The algorithms may be structured to select B beams and U users, where $B \leq N_{RF,BS}$, and $U \leq B$. A first case is one where there is no signal strength or order information in the user feedbacks respectively identifying their preferred RF transmit beams. The basis of the algorithm is summarized as follows.

(Step 1) For each beam fed back by a respective user terminal in the candidate user set, the base station (BS) finds the number of other users or the total number of users in the candidate user set who fed back the same beam identification, i.e., thus finding the number of collisions for that identified beam.

(Step 2) Next the base station (BS) selects a transmit beam having a least number of collisions. It then selects a user terminal associated with the selected beam (a UE that preferred that beam). If there are more than one user terminals that have selected that beam, the algorithm either randomly selects an associated user terminal or selects a user terminal which has the least total number of collisions for all it feedback identified beams.

(Step 3) Next the base station performed algorithm removes those user terminals from the candidate user set who have a beam colliding with any beam of the selected user terminal. It also removes the selected user terminal from the candidate user set.

Subsequently, if needed, the algorithm automatically repeats above steps (1)-(3) until the number of selected beams is equal to $N_{RF,BS}$ or until the candidate user set is empty. Note that for each iteration, there is an update to the number of collisions for the beams of the users remaining in the candidate user set as the collided users that have been removed in previous iteration(s) may have the beams colliding with the one for the users remaining in the candidate user set.

Denote $\mathcal{V}_k$ as the set of transmit RF beams fed back by user k. The details of the algorithm are described as the following Algorithm 1 (Selects transmit RF beams and associated user terminals for case of multi-beam feedback without signal strength feedback):

---

Initializations: Set the selected transmit beam set $\tilde{\mathcal{V}}_*= \emptyset$ and selected user set $\tilde{\mathcal{K}} = \emptyset$. Set candidate user set $\mathcal{K} = \{1, \ldots, K\}$.
  While $|\tilde{\mathcal{V}}_*| < N_{RF,BS}$ and $\mathcal{K} \neq \emptyset$
  For $k \in \mathcal{K}$, form the interfering user set $I_{k,i}$ for each beam $v_{k,i,RF} \in \mathcal{V}_k$,
$I_{k,i} = \{k' | k' \in \mathcal{K}, k' \neq k, v_{k,i,RF} \in \mathcal{V}_{k'}\}$. Obtain $a_{k,i} = |I_{k,i}|$, where $|.|$ denotes the cardinality of the set.
  Find the beam $v_{k^*,i^*}$ with $$\{k^*, i^*\} = \arg \min_{k \in K, v_{k,i,RF} \in V_k} a_{k,i}. \quad (22)$$

Select the beam $v_{k^*,i^*}$ and update $\tilde{\mathcal{V}}_* = \tilde{\mathcal{V}}_* \cup \{v_{k^*,i^*,RF}\}$.

If only one user, i.e., user $k^*$, has the beam $v_{k^*,i^*,RF}$, then select user $k^*$, $\hat{k}^* = k^*$. If there are more than one users, we can randomly select one user or select the user $\hat{k}^*$ with the minimum total number of collisions for the user, i.e., $$\hat{k}^* = \arg \min_{k \in K, v_{k^*,i^*,RF} \in V_k} \sum_i a_{k,i} \quad (23)$$

Let $\tilde{\mathcal{K}} = \tilde{\mathcal{K}} \cup \{\hat{k}^*\}$. For any user $k' \in K$, $k' \neq k^*$, remove user $k'$ from K, i.e., $\mathcal{K} = \mathcal{K} \backslash \{k'\}$, if $\mathcal{V}_k \cap \mathcal{V}_{k^*} \neq \emptyset$.
  end of While
  Output $\tilde{\mathcal{V}}_*$ and $\tilde{\mathcal{K}}$. For the transmit RF beamforming matrix $F_{RF}$ with the RF beams in $\tilde{\mathcal{V}}_*$.
  end of Algorithm 1 (Transmit RF beam and user selections for multi-beam feedback without signal strength feedback.)

---

The above Algorithm 1 can be modified to incorporate a scheduling weight $\alpha_k$. Again, the scheduling weight is a real value representing the priority of user and can be determined by the average user rate. The procedures for the modified Algorithm 1 are substantially the same as that in Algorithm 1. However, in its step 4, instead of using the number of collisions $\alpha_{k,i}$ as the metric for beam selection, it is replaced with a weighted number of collisions, i.e., multiplying the number of collisions with a weight scalar, which is the inverse of the scheduling priority $\alpha_k$, given as $$\frac{1}{\alpha_k} a_{k,i}.$$

Thus the beam selection in step 4 can be replaced as, $$\{k^*, i^*\} = \arg \min_{k \in K, v_{k,i,RF} \in V_k} \frac{1}{\alpha_k} a_{k,i}.$$

Similarly in its step 6, it selects the associated user as $$\hat{k}^* = \arg \min_{k \in K, v_{k^*,i^*,RF} \in V_k} \frac{1}{\alpha_k} \sum_i a_{k,i}. \quad (25)$$

Next considered are scenarios where a signal strength metric $s_k(v_{k,i,RF})$ is available in the feedback. The following Algorithm 2 is configured to select the transmit beams and corresponding user terminals based on signal to interference leakage power plus noise ratio which is the ratio of the receipt strength or receipt quality of the transmit RF beam of the user terminal in its feedback report and the summation of the receipt strength or receipt quality of the transmit RF beam of all other user terminals that feedback this transmit RF beam in their feedback and a noise power scaled with a configurable factor. The mathematical definition of signal to interference leakage power plus noise ratio for the i-th RF beam from $$\gamma_{k,i} = \frac{s_k(v_{k,i,RF}, g_{RF})}{\sum_{k' \in \mathcal{K}, k' \neq k, v_{k,i,RF} \in \mathcal{V}_{k'}} s_{k'}(v_{k,i,RF}, g_{RF}) + \beta_k \sigma_k^2}.$$

where $\beta_k$ can be adjusted by the base station. The algorithm for user and beam selections is described in Algorithm 2.

Initializations: Set the selected transmit beam set $\mathcal{V}_a^* = \emptyset$ and selected user set $\mathcal{\hat{K}} = \emptyset$. Set candidate user set $\mathcal{K} = \{1, \ldots, K\}$.
While $|\mathcal{V}_a^*| < N_{RF,BS}$ and $\mathcal{K} \neq \emptyset$
For $k \in \mathcal{K}$, form the interfering user set for the beam $v_{k,i,RF} \in \mathcal{V}_i$, $I_{k,i} = \{k'|k' \in \mathcal{K}, k' \neq k, v_{k',i,RF} \in \mathcal{V}_{k'}\}$. Compute the signal to leakage power plus noise for each beam as $$\gamma_{k,i} = \frac{s_k(v_{k,i,RF}, g_{RF})}{\sum_{k' \in \mathcal{K}, k' \neq k, v_{k',i,RF} \in \mathcal{V}_{k'}} s_{k'}(v_{k',i,RF}, g_{RF}) + \beta_k \sigma_k^2}. \quad (26)$$

Find the beam $v_{k^*,i^*}$ with $$\{k^*, i^*\} = \arg \max_{k \in \mathcal{K}, v_{k,i,RF} \in \mathcal{V}_k} \gamma_{k,i}. \quad (27)$$

Select the beam $v_{k^*,i^*}$ and update $\mathcal{V}_a^* = \mathcal{V}_a^* \cup \{v_{k^*,i^*,RF}\}$.
We can select user $k^*$ and update $\mathcal{\hat{K}} = \mathcal{\hat{K}} \cup \{k^*\}$.
For any user $k'$, $k' \neq k^*$, remove user $k'$ from $\mathcal{K}$, i.e., update $\mathcal{K} = \mathcal{K} \setminus \{k'\}$, if $\mathcal{V}_i \cap \mathcal{V}_{k'} \neq \emptyset$.
end of While
Output $\mathcal{V}_a^*$ and $\mathcal{\hat{K}}$. For the transmit RF beamforming matrix $F_{RF}$ with the RF beams in $\mathcal{V}_a^*$.
end of Algorithm 2 (Transmit RF beam and user selections for multi-beam feedback with signal strength feedback.)

Note that in part (26), the algorithm may consider $\sigma_k^2 = 1$ for the unit noise variance after receive RF combining. It may also set $\beta_k = 1$ if it is assumed there is only one RF chain, i.e., one digital received signal at the receiver. Other values may be set when the receiver has more than one RF chains. It can be some configurable values to regularize the metric $\gamma_{k,i}$.

Some computer simulation results are considered in the following. The simulation models a two-dimensional planar antenna array and a narrow channel model similar as in equation [1]. The channels in High frequency band are expected to have limited scattering. To incorporate this effect, a geometric channel model is adopted with $L_k$ scatterers for user k. Each scatterer is assumed to contribute a single propagation path between the BS and UE. Under the geometric model, the channel $H_k$ can be expressed as $$H_k = \sqrt{\frac{1}{L_k}} \sum_{l}^{L_k} h_{k,l} a_{UE}(\theta_{k,l,UE}, \phi_{k,l,UE}) a_{BS}^{\dagger}(\theta_{k,l,BS}, \phi_{k,l,BS}), \quad (28)$$

where $h_{k,l}$ the complex gain of the l th path, $\theta_{k,l,UE}$ and $\phi_{k,l,UE}$ are horizontal and vertical angles of the arrivals, respectively, of the l th path at the UE. $\theta_{k,l,BS}$ and $\phi_{k,l,BS}$ are horizontal and vertical angles of the departures, respectively, of the l th path at the BS. The component $\alpha_{m,n}(\theta,\phi)$ of the m th antenna in the n th row is given by $$a_{m,n}(\theta, \phi) = \exp\left(j\left(\frac{2\pi}{\lambda} md \sin \theta \cos \phi + \frac{2\pi}{\lambda} nd \sin \phi\right)\right). \quad (29)$$

In the simulation, it was assumed $L_k = 3$ for all users and the variances of the channel gain $h_{k,l}$ are equal, i.e., $E\{|h_{k,l}|^2\} = 1$.

One simulation first set $K=4$, $N_{RF,BS}=4$, i.e., the RF chain is enough to support all users. For the baseband precoding it consider the case of zero-forcing precoding. The RF beam quantization is set to 3-bit per horizontal or vertical dimension at the base station, i.e., 64 quantized RF beams, and 2-bit per dimension at the UE, i.e., 16 quantized RF beams.

The horizontal angle range of the analog beamforming and the channel modeling is $[-\pi/2, \pi/2]$ for both base station and user terminal. The angle range in vertical direction is $[-\pi/2, 0]$ for the base station side and $[0, \pi/2]$ for the terminal. The simulation results for equal SNR among all users may be presented as a function of number of transmit antennas at the BS. The number of antennas at BS may vary from 3×3, 4×4, to 10×10. For the simulated UEs, a 4×4 antenna array is assumed. The modeling assumes that average receive SNR is the same among all users which is set at 0 dB. It considers the following cases for performance comparison, namely, one without collision control as a baseline, a single beam identifying feedback with and without signal strength (or CQI), a two beams identifying feedback with and without signal strength feedback. For the two beam feedback without the signal strength, Algorithm 1 is employed for the user and beam selection. For the two beam feedback with the signal strength, Algorithm 2 is employed. FIG. 3 shows one such set of simulation results.

In practice, the user terminals in a cell area usually have different average SNR due to different locations, consequently, different distance to the base station. It is then natural to consider user terminals with unequal average SNR or different geometry. One modeling approach uses a simple model for unequal SNR among the users. It considers three different SNR values, i.e., 0 dB, +6 dB, and −6 dB. For each user, one of three SNRs is randomly chosen and assigned to the user. All other settings are exactly same as before in the other simulations. The resulting per-user average rate and sum-rate for hybrid beamforming may then be shown in graphs similar to FIG. 3. It was found from the simulations that that multiple beams identifying feedback improves both per-user average rate and sum-rate performance over the single beam feedback counterpart with or without CQI feedback. For either single beam feedback or two-beam feedback, the one with CQI feedback outperforms the one without CQI feedback, particularly for two-beam feedback where the one with CQI feedback provides a large gain over that without CQI feedback on both per-user average rate and sum-rate. Generally, the two-beams identifying feedback approach has a larger gain over the one-beam feedback approach for the unequal average SNR scenarios. Similar trends can be found for sum-rate performance as in FIG. 3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hybrid beamforming method by a base station, comprising:
   sequentially indexing through a finite set of RF output beam patterns using an analog beamforming subsystem of the base station while transmitting pilot signals;
   receiving wireless feedback reports from one or more terminals identifying at least one preferred RF output beam pattern as received by the respective feedback-providing terminal;
   assigning to one assignable transmission slot, two or more of the feedback-providing terminals for simultaneous use for forward link transmissions reporting a same preferred RF output beam pattern; and
   selecting different RF output beam patterns for carrying simultaneous data transmissions respectively for each of the two or more assigned terminals, wherein
   the assigning of the two or more terminals to the assignable transmission slot and the selecting of the different RF output beams for each of the two or more terminals is based on the respective wireless feedback reports received by the base station, and the selecting of different RF output beam patterns for each of the two or more terminals reporting the same preferred RF output beam pattern is based on a metric considering potential interference of co-selected RF output beam patterns to a signal of each selected feedback-providing terminal transmitted with one or more of the selected RF output beam patterns.

2. The method of claim 1 wherein the base station has a plural number of available RF chains and a plural number of antennas operatively coupled to the available RF chains for forming the set of RF output beam patterns.

3. The method of claim 1 wherein said respective wireless feedback reports identifying preferred RF output beam patterns includes those identifying at least the strongest or best quality one of the received RF output beam patterns.

4. The method of claim 3 wherein said received signals for which feedback is provided are pilot signals occupying pre-assigned pilot slots in the transmission block.

5. The method of claim 1 wherein said identifying of at least one preferred RF output beam pattern utilizes a report minimizing technique selected from the group consisting of:
the respective feedback-providing terminals each providing an index value identifying its locally determined to be preferred at least one RF output beam pattern;
the respective feedback-providing terminals each providing two or more index values, but not in any particular order, the index values identifying a locally determined set of N strongest ones of its locally received portions of the one or more RF output beam patterns, where N is an integer indicating the number of index values;
the respective feedback-providing terminals each providing two or more index values, in a predefined ranking order, the index values identifying a locally determined set of N strongest ones of locally received portions of the one or more RF output beam patterns, where N is an integer indicating the number of index values;
the respective feedback-providing terminals each providing one or more function coefficient values, identifying a set of locally determined to be N strongest ones of its locally received portions of the one or more RF output beam patterns, where N is an integer indicating the number of identified RF output beam patterns and where the one or more function coefficient values are applicable to a predefined function such that the identities of the N RF output beam patterns can be derived from the predefined function having the provided one or more function coefficient values;
the respective feedback-providing terminals each providing two or more index values, but not in any particular order, the provided index values identifying a set of locally determined to be N strongest ones of locally received portions of the one or more RF output beam patterns, where N is an integer indicating the number of index values and the respective feedback-providing terminals each further providing a received signal strength or a channel quality index (CQI) for each of the identified N strongest RF output beam patterns;
the respective feedback-providing terminals each providing two or more index values, in a predefined ranking order, identifying locally determined to be N strongest ones of locally received portions of the one or more RF output beam patterns, where N is an integer indicating the number of index values and the respective feedback-providing terminals each further providing a received signal strength or a channel quality index (CQI) for each of the identified N strongest RF output beam patterns; and
the respective feedback-providing terminals each providing one or more function coefficient values, identifying locally determined to be N strongest ones of locally received portions of the one or more RF output beam patterns, where N is an integer indicating the number of identified RF output beam patterns and where the one or more function coefficient values are applicable to a predefined function such that the identities of the N RF output beam patterns can be derived from the predefined function having the provided one or more function coefficient values and the respective feedback-providing terminals each further providing a received signal strength or a communication quality index (CQI) for each of the identified N strongest RF output beam patterns.

6. The method of claim 1 wherein each base station (BS) has a baseband precoding section configurable to provide corresponding baseband precoding for tunable baseband filtering sections of the respective wireless terminals.

7. The method of claim 5 wherein said report minimizing technique comprises:
providing identifications of two or more of the respective RF output beams coded as a combinatorial value which is a summation of binomial coefficients of the index of an identified output beam and the index of this beam in the feedback report.

8. The method of claim 5 wherein:
the number of respective RF output beam patterns that each of the feedback-providing terminals identifies in its feedback is determined by configuration data provided by a network or is based on a pre-specified receipt signal strength requirement and/or on a pre-specified requirement that receipt quality exceed predetermined thresholds, and/or on receipt quality being within a predetermined strength gap as measured between the strongest received signal strengths for the respectively identified RF output beam patterns transmitted from the base station.

9. The method of claim 1 wherein said causing of the base station to assign to one assignable transmission slot two or more different RF output beam patterns for carrying out respective data transmissions for the two or more assigned terminals is preceded by:
causing of the base station to instruct the one or more assigned terminals to expect corresponding transmissions with the respective two or more different RF output beam patterns in the assigned at least one assignable transmission slot.

10. The method of claim 1 wherein said causing of the base station to select two or more different RF output beam patterns for carrying out respective data transmissions for the two or more assigned terminals in the assigned at least one assignable transmission slot further comprises:
causing of the base station to sequentially:
(a) select a transmit RF beam pattern from a set of candidate transmit beam patterns according to an ascending order of the number of collisions or weighted number of collisions of the transmit RF beam patterns in the candidate transmit beam patterns set;
(b) select a terminal from a set of candidate user terminals, where the selected terminal is one that identified the selected transmit RF beam pattern in its feedback report, the selecting being either a randomly performed one or by selecting the one candidate user terminal with least summation of number of collisions or weighted number of collisions of all transmit RF beams identified in its feedback report;

(c) update the candidate transmit RF beam patterns set by removing the selected RF beam patterns from the candidate beam patterns set;

(d) update the candidate user terminal set by removing all the user terminals that identified the selected transmit RF beam pattern in their respective feedback reports; and (e) repeat above steps (a)-(d) until a predetermined maximal number of allowed selections of RF beam patterns is reached or the latest updated candidate transmit RF beam patterns set is empty or the latest updated candidate user terminals set is empty.

11. The method of claim 10 wherein said number of collisions for each transmit RF beam pattern is the number of user terminals that identified that transmit RF beam pattern in their respective feedback reports.

12. The method of claim 10 wherein said weighted number of collisions for each transmit RF beam pattern is a production of a weight scalar and the number of user terminals that identified that transmit RF beam in their respective feedback reports.

13. The method of claim 12 wherein said the weight scalar is a user specific weight that is a function of an inverse of a priority of the user.

14. The method of claim 1 wherein said causing of the base station to respectively use one or more different RF output beam patterns for carrying out respective data transmissions for the two or more assigned terminals in the assigned at least one of the assignable transmission slots includes causing the base station to sequentially:

(a) jointly select a transmit RF beam pattern and a user terminal respectively from a set of candidate transmit beam RF beam patterns and a set of candidate user terminals according to an ascending order of computed signal to leaked interference power plus noise ratio or weighted signal to leaked power plus noise ratio;

(b) update the candidate transmit RF beam patterns set by removing the selected RF beam pattern from the candidate beam patterns set (c) update the candidate user terminals set by removing all the user terminals that identified the selected transmit RF beam pattern in their respective feedback reports; and (d) repeat above steps (a)-(c) until a predetermined maximal number of allowed selectings of RF beam patterns is reached or the latest updated candidate transmit RF beam patterns set is empty or the latest updated candidate user terminals set is empty.

15. The method of claim 14 wherein the computed signal to leaked interference ratio or weighted signal to leaked power plus noise ratio of a transmit RF beam pattern and a user terminal is a ratio of the receipt strength or receipt quality of the transmit RF beam pattern as indicated by the user terminal in its feedback report and the summation of the receipt strength or receipt quality of the transmit RF beam patterns of all other user terminals that identified the selected transmit RF beam pattern in their feedback reports and a noise power scaled with a configurable factor.

16. The method of claim 14 wherein the computed weighted signal to leaked interference ratio or weighted signal to leaked power plus noise ratio of a selectable transmit RF beam pattern and a selectable user terminal is a production of a weight scalar and the ratio of the receipt strength or receipt quality of the transmit RF beam of the user terminal as indicated in its feedback report and the summation of the receipt strength or receipt quality for the same transmit RF beam pattern of all other user terminals that identified this transmit RF beam pattern in their respective feedback reports and a noise power scaled with a configurable factor.

17. The method of claim 1, wherein the metric is one of feedback-providing terminal rate or weighted user rate and accounts for the interference from at least one of the co-selected RF output beam patterns, a number of beam collisions and signal to leakage power and noise ratio.

18. A hybrid beamforming system comprising:
a base station having a digital precoding portion and an analog RF beamforming portion; and
a plurality of wireless terminals each having a respective analog RF beam tuning portion and/or a corresponding baseband digital fine tuning portion;
wherein the base station is configured to:
establish wireless communication with the wireless terminals using a transmission protocol having one or both of pre-assigned and assignable transmission slots;
sequentially index through a finite set of RF output beam patterns formable by the base station using the analog beamforming portion of the base station;
receive wireless feedback reports from one or more of the wireless terminals identifying at least one preferred RF output beam pattern received by the corresponding one or more wireless terminals;
assign to at least one of the assignable transmission slots, two or more wireless terminals that produced the wireless feedback reports for simultaneous use for forward link transmissions reporting a same preferred RF output beam pattern; and
selecting different RF output beam patterns for carrying simultaneous data transmissions respectively for each of the two or more assigned wireless terminals;
use two or more different RF output beam patterns for carrying out respective data transmissions for each of the two or more assigned wireless terminals in the assigned at least one of the assignable transmission slots based on the respective wireless feedback reports received by the base station, wherein
the selecting of different RF output beam patterns for each of the two or more wireless terminals reporting the same preferred RF output beam pattern is based on a metric considering potential interference of co-selected RF output beam patterns to a signal of each selected wireless terminal transmitted with one or more of the selected RF output beam patterns.

19. The system of claim 18 wherein the base station has a plural number of available RF chains for forming correspondingly different RF beam patterns.

20. The system of claim 18 wherein said respective wireless feedback reports each identify at least a preferred RF beam pattern as being at least a strongest or best quality one of the RF output beam patterns received by the respective wireless terminal.

21. The system of claim 18 wherein each of the wireless terminals has a baseband filtering section that can be tuned by way of channel training and wherein the base station (BS) has a baseband precoding section configurable to provide corresponding baseband precoding for the tuned baseband filtering sections of the respective wireless terminals.

22. A mobile terminal usable in a hybrid beamforming system which establishes wireless communication between a base station and the mobile terminal while using a transmission protocol having one or both of pre-assigned and assignable transmission slots, the mobile terminal comprising:
an analog RF beam tuning portion and a corresponding baseband digital fine tuning portion; and wherein the mobile terminal is configured to:
receive one or more of a sequentially indexed through a finite set of different RF output beam patterns formed by the base station using an analog beamforming subsystem of the base station; and
feedback to the base station a report identifying at least one or more preferred RF output beam patterns, wherein
the mobile terminal is assigned by the base station to one assignable transmission slot for simultaneous use with one or more other mobile terminals for forward link transmission reporting a same preferred RF output beam pattern and different RF output beam patterns are selected by the base station to carry simultaneous data transmissions for each of the assigned mobile terminals,
the assigning of the mobile terminals to the assignable transmission slot and the selecting of the different RF output beams by the base station for each of the two or more mobile terminals is based on the report provided by the mobile terminals, and
the selecting of different RF output beam patterns by the base station for each of the two or more mobile terminals reporting the same preferred RF output beam pattern is based on a metric considering potential interference of co-selected RF output beam patterns to a signal of each selected mobile terminals with one or more of the selected RF output beam patterns.

23. The wireless terminal of claim 22 wherein the mobile terminal is further configured to:
provide in its report to the base station an identification of two or more of a strongest or best quality of the received RF output beams.

* * * * *